US012330690B2

(12) United States Patent
Foster et al.

(10) Patent No.: US 12,330,690 B2
(45) Date of Patent: Jun. 17, 2025

(54) SYSTEMS AND METHODS FOR OPERATING AN AUTONOMOUS VEHICLE

(71) Applicant: TUSIMPLE, INC., San Diego, CA (US)

(72) Inventors: Scott Douglas Foster, San Diego, CA (US); Neil M. Overmon, Redwood City, CA (US); Erik Orlando Portillo, Sterling, VA (US); Zhujia Shi, San Diego, CA (US); Joyce Tam, Pleasanton, CA (US)

(73) Assignee: TUSIMPLE, INC., San Diego, CA (US)

( * ) Notice: Subject to any disclaimer, the term of this patent is extended or adjusted under 35 U.S.C. 154(b) by 288 days.

(21) Appl. No.: 17/804,532

(22) Filed: May 27, 2022

(65) Prior Publication Data
US 2022/0379924 A1 Dec. 1, 2022

Related U.S. Application Data

(60) Provisional application No. 63/194,489, filed on May 28, 2021, provisional application No. 63/194,492, filed on May 28, 2021.

(51) Int. Cl.
B60W 60/00 (2020.01)
B60W 30/18 (2012.01)
B60W 40/105 (2012.01)

(52) U.S. Cl.
CPC .. *B60W 60/0027* (2020.02); *B60W 30/18154* (2013.01); *B60W 30/18163* (2013.01);
(Continued)

(58) Field of Classification Search
CPC ......... B60W 60/0027; B60W 60/0015; B60W 30/18154; B60W 30/18163;
(Continued)

(56) References Cited

U.S. PATENT DOCUMENTS 11,472,433 B2 * 10/2022 Yoo ............... B60W 60/001
2015/0203112 A1 * 7/2015 Duncan .......... B60W 30/0956
701/1
(Continued)

FOREIGN PATENT DOCUMENTS

DE 10 2014 226232 A1 6/2016
DE 10 2015 226232 A1 6/2017
(Continued)

OTHER PUBLICATIONS

DE Patent Publication No. 10 2015 226232 is in the German language. A machine translation of the publication in the English language is filed herewith.
DE Patent Publication No. 10 2018 209653 is in the German language. A machine translation of the publication in the English language is filed herewith.
(Continued)

Primary Examiner — Hussein Elchanti
(74) Attorney, Agent, or Firm — Perkins Coie LLP

(57) ABSTRACT

An autonomous vehicle (AV) includes features that allows the AV to comply with applicable regulations and statues for performing safe driving operation. An example method for operating the AV includes determining a trajectory related information of a vehicle operating on a roadway on which the AV is operating; receiving sensor data of a first area that includes the vehicle; determining an additional trajectory related information for the AV by comparing the trajectory related information of the vehicle to a current trajectory related information of the AV, wherein the additional trajectory related information is based on a category to which the vehicle belongs, and wherein the additional trajectory related information allows the AV to maintain at least a distance between the AV and the vehicle; and causing the AV to operate in accordance with the additional trajectory related information.

17 Claims, 9 Drawing Sheets

(52) U.S. Cl.
CPC ...... *B60W 40/105* (2013.01); *B60W 60/0015* (2020.02); *B60W 2554/402* (2020.02); *B60W 2554/4046* (2020.02); *B60W 2554/80* (2020.02)

(58) Field of Classification Search
CPC ......... B60W 40/105; B60W 2554/402; B60W 2554/80; B60W 2554/4046
See application file for complete search history.

(56) References Cited

U.S. PATENT DOCUMENTS

| | | | | |
|---|---|---|---|---|
| 2018/0297593 | A1* | 10/2018 | Pitale | G08G 1/166 |
| 2019/0049994 | A1* | 2/2019 | Pohl | G08G 1/166 |
| 2019/0291726 | A1 | 9/2019 | Shalev-Shwartz et al. | |
| 2020/0062249 | A1 | 2/2020 | Light et al. | |
| 2020/0079368 | A1* | 3/2020 | Yamada | G08G 1/166 |
| 2020/0342760 | A1* | 10/2020 | Vassilovski | G08G 1/161 |
| 2021/0039650 | A1 | 2/2021 | Yu | |

FOREIGN PATENT DOCUMENTS

| | | |
|---|---|---|
| DE | 10 2018 209653 A1 | 2/2019 |
| DE | 10 2018 218973 A1 | 5/2020 |

OTHER PUBLICATIONS

DE Patent Publication No. 10 2018 218973 is in the German language. A machine translation of the publication in the English language is filed herewith.
DE Patent Publication No. 10 2014 226232 is in the German language. A machine translation of the publication in the English language is filed herewith.
International Search Report and Written Opinion for PCT/US2022/072633, Mailing Date: Aug. 26, 2022, 17 pages.
Polizei Bremerhaven: "Achtung Schwertransporte", Oct. 18, 2016, retrieved from the Internet, URL: https://www.facebook.com/groups/279994258699806/posts/2159252740773939/, retrieved on Aug. 11, 2022.
Komando Streitkraftebasis, Bonn: "Achtung Kolonne So verhalten Sie sich richtig", Mar. 1, 2020, retrieved from the Internet, URL: https://www.bundeswehr.de/resource/blob/179422/8f2a090d36f45698dcd1709512063bba/flyer-achtung-kolonne-so-verhalten-sich-sich-richtig-data.pdf, retrieved on Aug. 11, 2022.
Security and Privacy Controls for Information Systems and Organizations, Joint Task Force, National Institute of Standards and Technology, U.S. Department of Commerce, NIST Special Publication 800-53, Revision 5, Sep. 2020, includes updates as of Dec. 12, 2020, 492 pages.

* cited by examiner

SYSTEMS AND METHODS FOR OPERATING AN AUTONOMOUS VEHICLE

PRIORITY CLAIMS AND RELATED PATENT APPLICATIONS

This patent document claims the priority to and the benefits of U.S. Provisional Application No. 63/194,489 entitled "SYSTEM AND METHOD FOR AN AUTONOMOUS VEHICLE" filed on May 28, 2021, and U.S. Provisional Application No. 63/194,492 entitled "SYSTEM AND METHOD FOR AN AUTONOMOUS VEHICLE" filed on May 28, 2021. The entire disclosures of the aforementioned applications are hereby incorporated by reference as part of the disclosure of this application.

TECHNICAL FIELD

The present disclosure relates generally to autonomous vehicles. More particularly, the present disclosure is related to operating an autonomous vehicle (AV) appropriately on public roads, highways, and locations with other vehicles or pedestrians.

BACKGROUND

Autonomous vehicle technologies can provide vehicles that can safely navigate towards a destination with limited or no driver assistance. The safe navigation of an autonomous vehicle (AV) from one point to another may include the ability to signal other vehicles, navigating around other vehicles in shoulders or emergency lanes, changing lanes, biasing appropriately in a lane, and navigate all portions or types of highway lanes. Autonomous vehicle technologies may enable an AV to operate without requiring extensive learning or training by surrounding drivers, by ensuring that the AV can operate safely, in a way that is evident, logical, or familiar to surrounding drivers and pedestrians.

SUMMARY

Systems and methods are described herein that can allow an autonomous vehicle (AV) to navigate from a first point to a second point. In some embodiments, the AV can navigate from the first point to the second point without a human driver present in the AV and to comply with instructions for safe and lawful operation.

According to an exemplary aspect of the present disclosure, a method of operating an autonomous vehicle is provided. The method includes determining, by a computer located in the autonomous vehicle, a trajectory related information of a vehicle operating on a roadway on which the autonomous vehicle is operating, where the trajectory related information for the vehicle includes a speed of the vehicle and a set of points on which the vehicle is predicted to travel; receiving, from a sensor located on the autonomous vehicle, sensor data of a first area that includes the vehicle; determining an additional trajectory related information for the autonomous vehicle by comparing the trajectory related information of the vehicle to a current trajectory related information of the autonomous vehicle, where the additional trajectory related information is based on a category to which the vehicle belongs that is determined using the sensor data, and where the additional trajectory related information allows the autonomous vehicle to maintain at least a distance between the autonomous vehicle and the vehicle; and causing the autonomous vehicle to operate in accordance with the additional trajectory related information of the autonomous vehicle.

In yet another exemplary aspect, a system for operating an autonomous vehicle, comprising a computer that includes a processor configured to perform the above-described methods and the methods described in this patent document.

In yet another exemplary aspect, the above-described methods and the methods described in this patent document are embodied in a non-transitory computer readable storage medium. The non-transitory computer readable storage medium includes code that when executed by a processor, causes the processor to perform the above-described methods and the methods described in this patent document.

In another exemplary embodiment, a device that is configured or operable to perform the above-described methods is disclosed. In yet another exemplary embodiment, a system comprises a computer located in a vehicle, the computer comprises a processor configured to implement the above-described methods is disclosed.

The above and other aspects and their implementations are described in greater detail in the drawings, the descriptions, and the claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Vehicles traversing highways and roadways are legally required to comply with regulations and statues in the course of safe operation of the vehicle. For autonomous vehicles (AVs), particularly autonomous tractor trailers, the ability to recognize a malfunction in its systems and stop safely can allow for a lawful and safe operation of the vehicle. Described below in detail are systems and methods for the safe and lawful operation of an autonomous vehicle on a roadway, including the execution of maneuvers that bring the autonomous vehicle in compliance with the law while signaling surrounding vehicles of its condition.

This patent document describes in Section I below an example vehicle ecosystem of an autonomous vehicle and driving related operations of the autonomous vehicle. Sections II and XIII describe a control center or oversight system for one or more autonomous vehicles, as well as various example features thereof and operations/processes performed thereby. Sections III to XII describe operations performed by the autonomous vehicle in various scenarios. The example headings for the various sections below are used to facilitate the understanding of the disclosed subject matter and do not limit the scope of the claimed subject matter in any way. Accordingly, one or more features of one example section can be combined with one or more features of another example section.

This patent document uses many abbreviations and uncommon terms. For instance, "GNSS" or "GPS" may refer to satellite navigation systems; when referring to an emergency vehicle, such as a police vehicle, ambulance, fire truck, tow truck, and the like, the abbreviation "EV" may be used; the acronym "TTC" indicates "time to collision"; "NPC" refers to non-player characters and may include any other vehicle that is not the autonomous vehicle in FIG. 1. For example, any surrounding vehicle, motorcycle, bicycle, and the like that are manually driven or autonomously driven and that may not be in communication with the autonomous vehicle may be considered NPC; a "k-ramp" denotes a freeway on/off ramp of a particular configuration; "STV" indicates a stopped vehicle; "ELV" may indicate an end-of-life or disabled vehicle, such as a disabled vehicle on a roadside; "OBO" may refer to an on-board operator or a human operator of an autonomous vehicle who temporarily takes control to assist during inspections, start-up, and/or ending of a trip or mission for the autonomous vehicle; and "LC" may be an abbreviation for lane change.

I. Example Ecosystem of an Autonomous Vehicle

Figure 1:
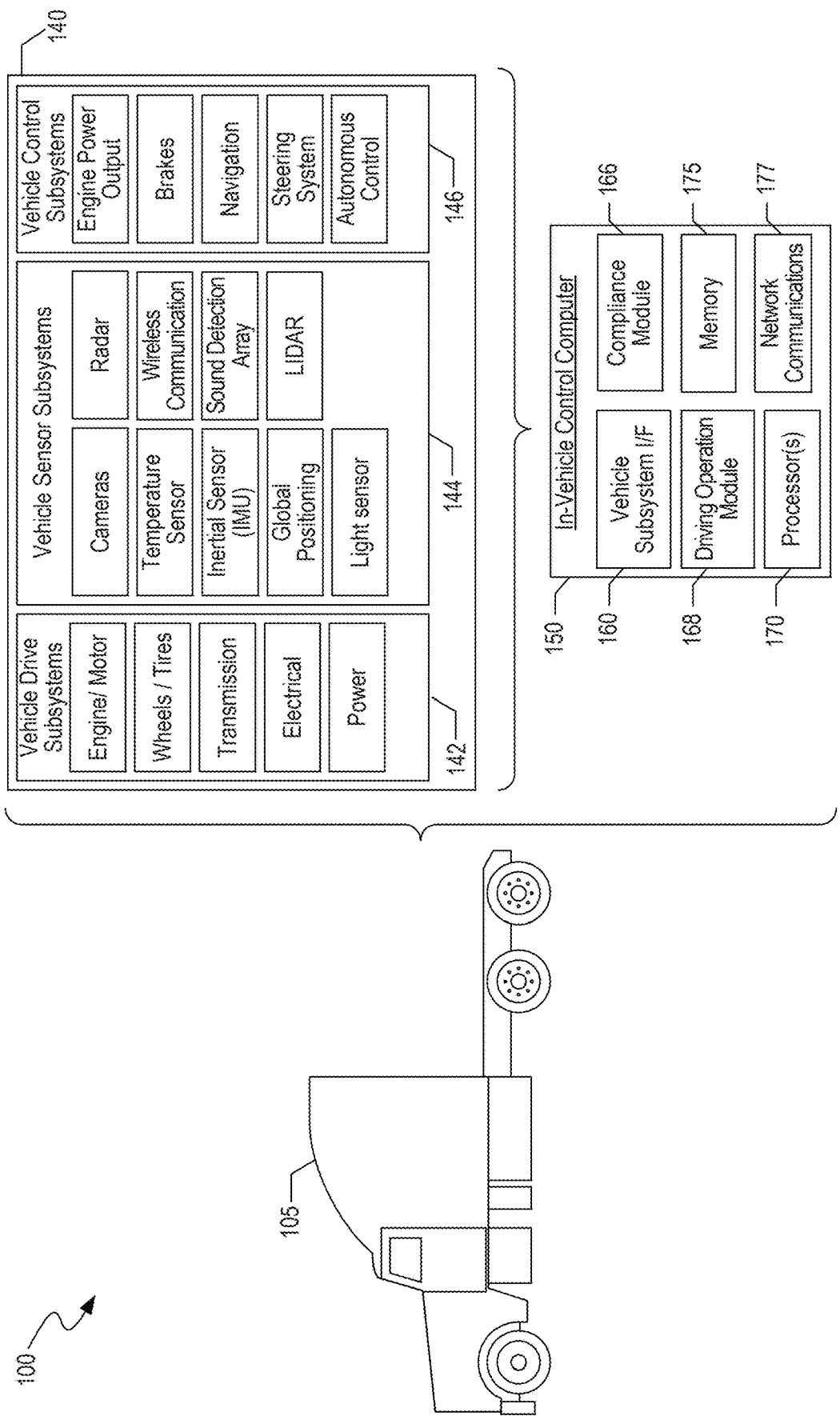
FIG. 1 illustrates a block diagram of an example vehicle ecosystem of an autonomous vehicle.

FIG. 1 shows a system 100 that includes an autonomous vehicle 105. The autonomous vehicle 105 may include a tractor of a semi-trailer truck. The autonomous vehicle 105 includes a plurality of vehicle subsystems 140 and an in-vehicle control computer 150. The plurality of vehicle subsystems 140 includes vehicle drive subsystems 142, vehicle sensor subsystems 144, and vehicle control subsystems 146. An engine or motor, wheels and tires, a transmission, an electrical subsystem, and a power subsystem may be included in the vehicle drive subsystems. The engine of the autonomous truck may be an internal combustion engine, a fuel-cell powered electric engine, a battery powered electrical engine, a hybrid engine, or any other type of engine capable of moving the wheels on which the autonomous vehicle 105 moves. The autonomous vehicle 105 have multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the autonomous vehicle 105, including those which would indicate a malfunction in the autonomous vehicle or another cause for an autonomous vehicle to perform a limited or minimal risk condition (MRC) maneuver or an emergency driving maneuver. A driving operation module (shown as 168 in FIG. 1) can perform an MRC maneuver by sending instructions that cause the autonomous vehicle to steer along a trajectory to a side of the road and to apply brakes so that the autonomous vehicle can be safely stopped to the side of the road. The sensors for general operation of the autonomous vehicle may include cameras, a temperature sensor, an inertial sensor (IMU), a global positioning system, a light sensor, a LIDAR system, a radar system, and wireless communications.

A sound detection array, such as a microphone or array of microphones, may be included in the vehicle sensor subsystem 144. The microphones of the sound detection array are configured to receive audio indications of the presence of, or instructions from, authorities, including sirens and command such as "Pull over." These microphones are mounted, or located, on the external portion of the vehicle, specifically on the outside of the tractor portion of an autonomous vehicle 105. Microphones used may be any suitable type, mounted such that they are effective both when the autonomous vehicle 105 is at rest, as well as when it is moving at normal driving speeds.

Cameras included in the vehicle sensor subsystems 144 may be rear-facing so that flashing lights from emergency vehicles may be observed from all around the autonomous truck 105. These cameras may include video cameras, cameras with filters for specific wavelengths, as well as any other cameras suitable to detect emergency vehicle lights based on color, flashing, of both color and flashing.

The vehicle control subsystem 146 may be configured to control operation of the autonomous vehicle, or truck, 105 and its components. Accordingly, the vehicle control subsystem 146 may include various elements such as an engine power output subsystem, a brake unit, a navigation unit, a steering system, and an autonomous control unit. The engine power output may control the operation of the engine, including the torque produced or horsepower provided, as well as provide control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more pre-determined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR (e.g., LIDAR), the cameras, and/or other vehicle subsystems to determine the driving path or trajectory for the autonomous vehicle 105. The autonomous control that may activate systems that the autonomous vehicle 105 has which are not present in a conventional vehicle, including those systems which can allow an autonomous vehicle to communicate with surrounding drivers or signal surrounding vehicles or drivers for safe operation of the autonomous vehicle.

An in-vehicle control computer 150, which may be referred to as a VCU, includes a vehicle subsystem interface 160, a driving operation module 168, one or more processors 170, a compliance module 166, a memory 175, and a network communications subsystem 178. This in-vehicle control computer 150 controls many, if not all, of the operations of the autonomous vehicle 105 in response to information from the various vehicle subsystems 140. The one or more processors 170 execute the operations that allow the system to determine the health of the autonomous vehicle, such as whether the autonomous vehicle has a malfunction or has encountered a situation requiring service or a deviation from normal operation and giving instructions. Data from the vehicle sensor subsystems 144 is provided to VCU 150 so that the determination of the status of the autonomous vehicle can be made. The compliance module 166 determines what action should be taken by the autonomous vehicle 105 to operate according to the applicable (e.g., local) regulations. Data from other vehicle sensor subsystems 144 may be provided to the compliance module 166 so that the best course of action in light of the autonomous vehicle's status may be appropriately determined and performed. Alternatively, or additionally, the compliance module 166 may determine the course of action in conjunction with another operational or control module, such as the driving operation module 168.

The memory 175 may contain additional instructions as well, including instructions to transmit data to, receive data from, interact with, or control one or more of the vehicle drive subsystem 142, the vehicle sensor subsystem 144, and the vehicle control subsystem 146 including the autonomous Control system. The in-vehicle control computer (VCU) 150 may control the function of the autonomous vehicle 105 based on inputs received from various vehicle subsystems (e.g., the vehicle drive subsystem 142, the vehicle sensor subsystem 144, and the vehicle control subsystem 146). Additionally, the VCU 150 may send information to the vehicle control subsystems 146 to direct the trajectory, velocity, signaling behaviors, and the like, of the autonomous vehicle 105. For example, compliance module 166 and/or the driving operation module 168 in the VCU 150 may send instructions to one or more devices of the autonomous vehicle 105. The one or more devices may include one or more devices in the vehicle drive subsystems 142, the vehicle sensor subsystems 144, or the vehicle control subsystems 146. These instructions sent by the VCU 150 to one or more devices in the autonomous vehicle 105 are configured to effectuate and result in certain operations and actions being performed by the one or more devices in accordance with the instructions. Operations resulting from the instructions being sent to the one or more devices may together form driving related operations performed by the autonomous vehicle 105. For example, the VCU 150 may send instructions to a motor in the steering system, to an actuator in a brake unit, an/or to the engine to cause one or more devices to operate in accordance with the instructions such that the autonomous vehicle 105 performs a maneuver, or steers to follow a trajectory at a specified (e.g., via the instructions) velocity and/or acceleration/deceleration. Thus, the instructions provided by the VCU 150 can allow the autonomous vehicle 105 to follow a trajectory to steer from a current lane on which the autonomous vehicle 105 is operating to an adjacent lane or to a shoulder area (e.g., emergency stopping lane or area on side of the roadway) on the roadway. The autonomous control vehicle control subsystem may receive a course of action to be taken from the compliance module 166 of the VCU 150 and consequently relay instructions to other subsystems to execute the course of action. In Sections III to XIII below, this patent document describes that the autonomous vehicle or a system performs certain functions or operations. These functions and/or the operations described can be performed by the compliance module 166 and/or the driving operation module 168.

Figure 2:
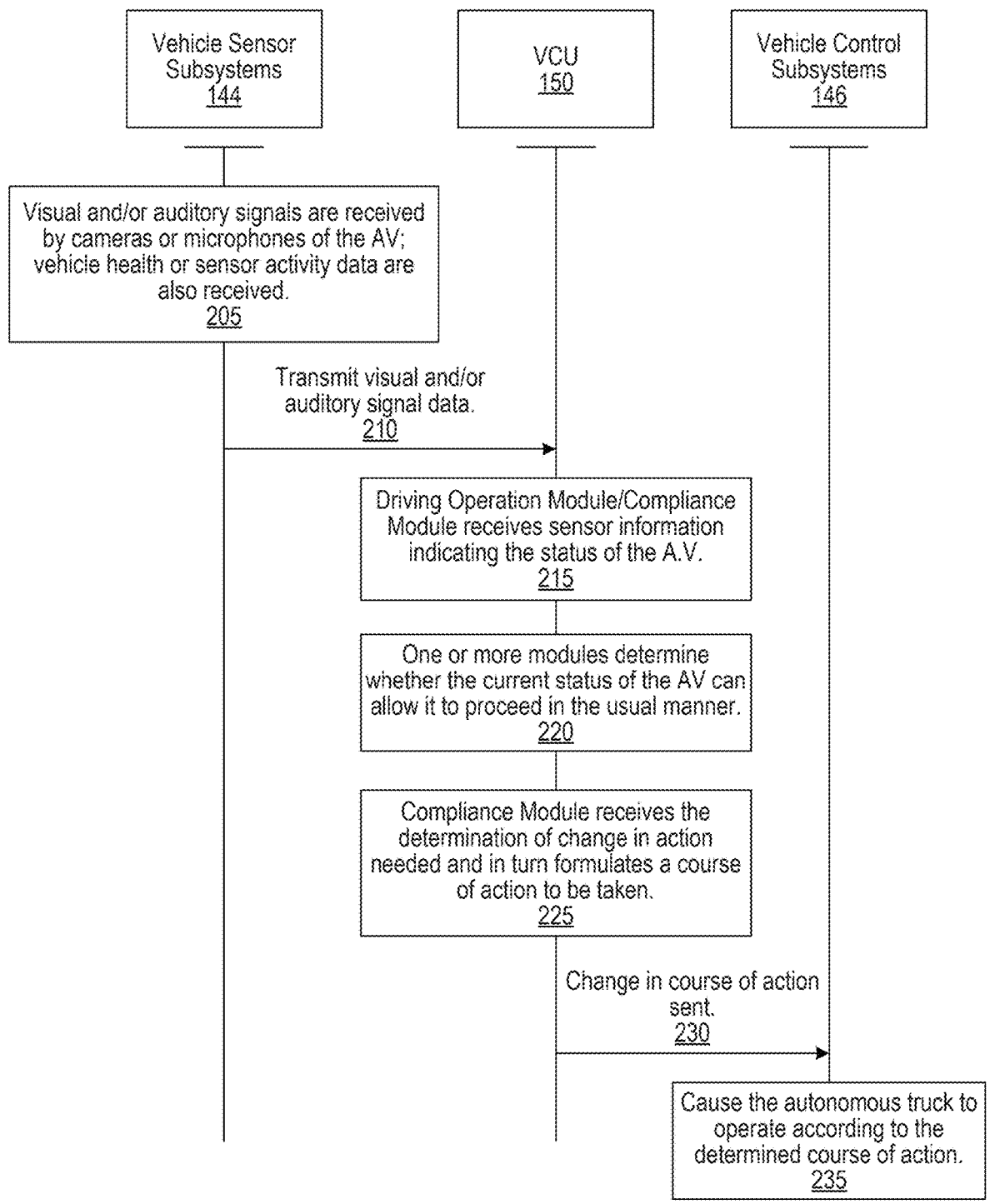
FIG. 2 shows a flow diagram for safe operation of an autonomous vehicle safely in light of the health and/or surroundings of the autonomous vehicle.

FIG. 2 shows a flow diagram for safe operation of an autonomous vehicle (AV) safely in light of the health and/or surroundings of the autonomous vehicle. Although this figure depicts functional steps in a particular order for purposes of illustration, the process is not limited to any particular order or arrangement of steps. One skilled in the relevant art will appreciate that the various steps portrayed in this figure may be omitted, rearranged, combined and/or adapted in various ways.

As shown in FIG. 2, the vehicle sensor subsystem 144 receives visual, auditory, or both visual and auditory signals indicating the at the environmental condition of the autonomous vehicle, as well as vehicle health or sensor activity data are received in step 205. These visual and/or auditory signal data are transmitted from the vehicle sensor subsystem 144 to the in-vehicle control computer system (VCU) 150, as in step 210. Any of the driving operation module and the compliance module receive the data transmitted from the vehicle sensor subsystem, in step 215. Then, one or both of those modules determine whether the current status of the autonomous vehicle can allow it to proceed in the usual manner or that the autonomous vehicle needs to alter its course to prevent damage or injury or to allow for service in step 220. The information indicating that a change to the course of the autonomous vehicle is needed may include an indicator of sensor malfunction; an indicator of a malfunction in the engine, brakes, or other components that may be necessary for the operation of the autonomous vehicle; a determination of a visual instruction from authorities such as flares, cones, or signage; a determination of authority personnel present on the roadway; a determination of a law enforcement vehicle on the roadway approaching the autonomous vehicle, including from which direction; and a determination of a law enforcement or first responder vehicle moving away from or on a separate roadway from the autonomous vehicle. This information indicating that a change to the autonomous vehicle's course of action or driving related operation is needed may be used by the compliance module to formulate a new course of action to be taken which accounts for the autonomous vehicle's health and surroundings, in step 225. The course of action to be taken may include slowing, stopping, moving into a shoulder, changing route, changing lane while staying on the same general route, and the like. The course of action to be taken may include initiating communications with any oversight or human interaction systems present on the autonomous vehicle. The course of action to be taken may then be transmitted from the VCU 150 to the autonomous control system, in step 230. The vehicle control subsystems 146 then cause the autonomous vehicle 105 to operate in accordance with the course of action to be taken that was received from the VCU 150 in step 235.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

II. Autonomous Truck Oversight System

Figure 3:
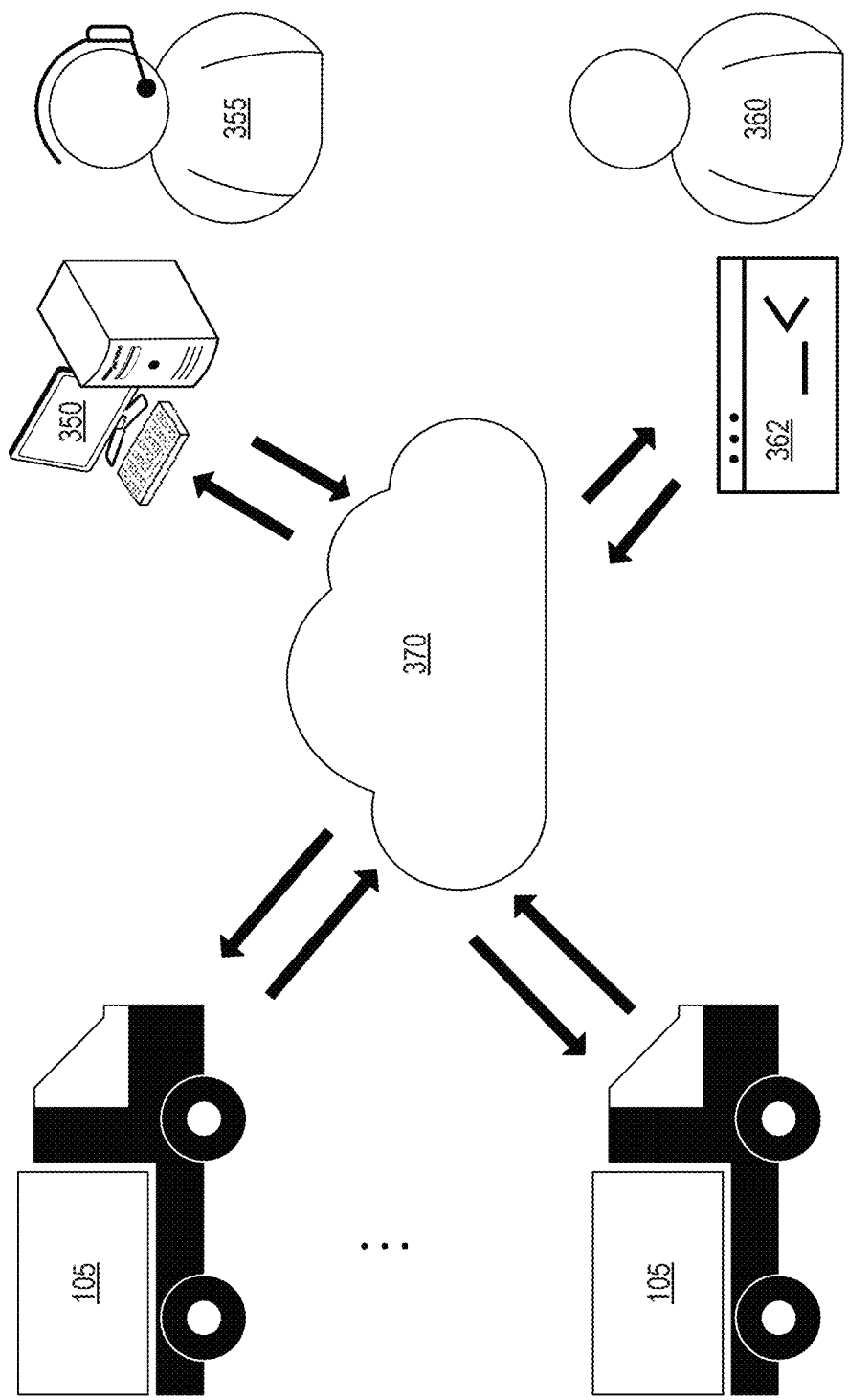
FIG. 3 illustrates a system that includes one or more autonomous vehicles, a control center or oversight system with a human operator (e.g., a remote center operator (RCO)), and an interface for third-party interaction.

FIG. 3 illustrates a system 300 that includes one or more autonomous vehicles 105, a control center or oversight system 350 with a human operator 355, and an interface 362 for third-party 360 interaction. A human operator 355 may also be known as a remoter center operator (RCO). Communications between the autonomous vehicles 105, oversight system 350 and user interface 362 take place over a network 370. In some instances, where not all the autonomous vehicles 105 in a fleet are able to communicate with the oversight system 350, the autonomous vehicles 105 may communicate with each other over the network 370 or directly. As described with respect to FIG. 1, the VCU 150 of each autonomous vehicle 105 may include a module for network communications 178.

An autonomous truck may be in communication with an oversight system. The oversight system may serve many purposes, including: tracking the progress of one or more autonomous vehicles (e.g., an autonomous truck); tracking the progress of a fleet of autonomous vehicles; sending maneuvering instructions to one or more autonomous vehicles; monitoring the health of the autonomous vehicle(s); monitoring the status of the cargo of each autonomous vehicle in contact with the oversight system; facilitate communications between third parties (e.g., law enforcement, clients whose cargo is being carried) and each, or a specific, autonomous vehicle; allow for tracking of specific autonomous trucks in communication with the oversight system (e.g., third-party tracking of a subset of vehicles in a fleet); arranging maintenance service for the autonomous vehicles (e.g., oil changing, fueling, maintaining the levels of other fluids); alerting an affected autonomous vehicle of changes in traffic or weather that may adversely impact a route or delivery plan; pushing over the air updates to autonomous trucks to keep all components up to date; and other purposes or functions that improve the safety for the autonomous vehicle, its cargo, and its surroundings. An oversight system may also determine performance parameters of an autonomous vehicle or autonomous truck, including any of: data logging frequency, compression rate, location, data type; communication prioritization; how frequently to service the autonomous vehicle (e.g., how many miles between services); when to perform a minimal risk condition (MRC) maneuver while monitoring the vehicle's progress during the maneuver; when to hand over control of the autonomous vehicle to a human driver (e.g., at a destination yard); ensuring an autonomous vehicle passes pre-trip inspection; ensuring an autonomous vehicle performs or conforms to legal requirements at checkpoints and weight stations; ensuring an autonomous vehicle performs or conforms to instructions from a human at the site of a roadblock, cross-walk, intersection, construction, or accident; and the like.

Included in some of the functions executed by an oversight system or command center is the ability to relay over-the-air, real-time weather updates to autonomous vehicles in a monitored fleet. The over-the-air weather updates may be pushed to all autonomous vehicles in the fleet or may be pushed only to autonomous vehicles currently on a mission to deliver a cargo. Alternatively, or additionally, priority to push or transmit over-the-air weather reports may be given to fleet vehicles currently on a trajectory or route that leads towards or within a pre-determined radius of a severe weather event.

Another function that may be encompassed by the functions executed by an oversight system or command center is the transmission of trailer metadata to the autonomous vehicle's computing unit (VCU) prior to the start of a cargo transport mission. The trailer metadata may include the type of cargo being transmitted, the weight of the cargo, temperature thresholds for the cargo (e.g., trailer interior temperature should not fall below or rise above pre-determined temperatures), time-sensitivities, acceleration/deceleration sensitivities (e.g., jerking motion may be bad because of the fragility of the cargo), trailer weight distribution along the length of the trailer, cargo packing or stacking within the trailer, and the like.

An oversight system or command center may be operated by one or more human, also known as an operator or a remote center operator (RCO). The operator may set thresholds for autonomous vehicle health parameters, so that when an autonomous vehicle meets or exceeds the threshold, precautionary action may be taken. Examples of vehicle health parameters for which thresholds may be established by an operator may include any of: fuel levels; oil levels; miles traveled since last maintenance; low tire-pressure detected; cleaning fluid levels; brake fluid levels; responsiveness of steering and braking subsystems; Diesel exhaust fluid (DEF) level; communication ability (e.g., lack of responsiveness); positioning sensors ability (e.g., GPS, IMU malfunction); impact detection (e.g., vehicle collision); perception sensor ability (e.g., camera, LIDAR, radar, microphone array malfunction); computing resources ability (e.g., VCU or ECU malfunction or lack of responsiveness, temperature abnormalities in computing units); angle between a tractor and trailer in a towing situation (e.g., tractor-trailer, 18-wheeler, or semi-truck); unauthorized access by a living entity (e.g., a person or an animal) to the interior of an autonomous truck; and the like. The precautionary action may include execution of a minimal risk condition (MRC) maneuver, seeking service, or exiting a highway or other such re-routing that may be less taxing on the autonomous vehicle. An autonomous vehicle whose system health data meets or exceeds a threshold set at the oversight system or by the operator may receive instructions that are automatically sent from the oversight system to perform the precautionary action.

The operator may be made aware of situations affecting one or more autonomous vehicles in communication with or being monitored by the oversight system that the affected autonomous vehicle(s) may not be aware of. Such situations may include: irregular or sudden changes in traffic flow (e.g., traffic jam or accident); abrupt weather changes; abrupt changes in visibility; emergency conditions (e.g., fire, sinkhole, bridge failure); power outage affecting signal lights; unexpected road work; large or ambiguous road debris (e.g., object unidentifiable by the autonomous vehicle); law enforcement activity on the roadway (e.g., car chase or road clearing activity); and the like. These types of situations that may not be detectable by an autonomous vehicle may be brought to the attention of the oversight system operator through traffic reports, law enforcement communications, data from other vehicles that are in communication with the oversight system, reports from drivers of other vehicles in the area, and similar distributed information venues. An autonomous vehicle may not be able to detect such situations because of limitations of sensor systems or lack of access to the information distribution means (e.g., no direct communication with weather agency). An operator at the oversight system may push such information to affected autonomous vehicles that are in communication with the oversight system. The affected autonomous vehicles may proceed to alter their route, trajectory, or speed in response to the information pushed from the oversight system. In some instances, the information received by the oversight system may trigger a threshold condition indicating that MRC (minimal risk condition) maneuvers are warranted; alternatively, or additionally, an operator may evaluate a situation and determine that an affected autonomous vehicle should perform an MRC maneuver and subsequently send such instructions to the affected vehicle. In these cases, each autonomous vehicle receiving either information or instructions from the oversight system or the oversight system operator uses its on-board computing unit (e.g. VCU) to determine how to safely proceed, including performing an MRC maneuver that includes pulling-over or stopping.

Other interactions that the remote center operator (RCO) may have with an autonomous vehicle or a fleet of autonomous vehicle includes any of the following: pre-planned event avoidance; real-time route information updates; real-time route feedback; trail hookup status; first responder communication request handling; notification of aggressive surrounding vehicle(s); identification of construction zone changes; status of an autonomous vehicle with respect to its operational design domain (ODD), such as alerting the RCO when an autonomous vehicle is close to or enters a status out of ODD; RCO notification of when an autonomous vehicle is within a threshold distance from a toll booth and appropriate instruction/communication with the autonomous vehicle or toll authority may be sent to allow the autonomous vehicle to bypass the toll; RCO notification of when an autonomous vehicle bypasses a toll; RCO notification of when an autonomous vehicle is within a threshold distance from a weigh station and appropriate instruction/communication with the autonomous vehicle or appropriate authority may be sent to allow the autonomous vehicle to bypass the weigh station; RCO notification of when an autonomous vehicle bypasses a weigh station; notification to the autonomous vehicle from the RCO regarding scheduling or the need for fueling or maintenance; RCO authorization of third-party access to an autonomous vehicle cab; ability of an RCO to start/restart an autonomous driving system (ADS) on a vehicle; ability of an administrator (possibly an RCO) to set roles for system users, including ground crew, law enforcement, and third parties (e.g., customers, owners of the cargo); support from a RCO for communication with a service maintenance system with fleet vehicles; notification to the RCO from an autonomous vehicle of acceleration events; instruction from a RCO to an autonomous vehicle to continue its mission even when communication is interrupted; RCO monitoring of an autonomous vehicle during and after an MRC maneuver is executed; support for continuous communication between an autonomous vehicle and a yard operator at facility where the autonomous vehicle is preparing to begin a mission or where the autonomous vehicle is expected to arrive; oversight system monitoring of software systems on an autonomous vehicle and oversight system receiving alerts when software systems are compromised; and the like.

An oversight system or command center may allow a third party to interact with the oversight system operator, with an autonomous truck, or with both the human system operator and an autonomous truck. A third party may be a customer whose goods are being transported, a law enforcement or emergency services provider, or a person assisting the autonomous truck when service is needed. In its interaction with a third party, the oversight system may recognize different levels of access, such that a customer concerned about the timing or progress of a shipment may only be allowed to view status updates for an autonomous truck, or may be able to view status and provide input regarding what parameters to prioritize (e.g., speed, economy, maintaining originally planned route) to the oversight system. By providing input regarding parameter prioritization to the oversight system, a customer can influence the route and/or operating parameters of the autonomous truck.

Actions that an autonomous vehicle, particularly an autonomous truck, as described herein may be configured to execute to safely traverse a course while abiding by the applicable rules, laws, and regulations may include those actions successfully accomplished by an autonomous truck driven by a human. These actions, or maneuvers, may be described as features of the truck, in that these actions may be executable programming stored on the VCU 150 (the in-vehicle control computer unit). These actions or features may include those related to reactions to the detection of certain types of conditions or objects such as: appropriate motion on hills; appropriate motion on curved roads, appropriate motion at highway exits; appropriate motion or action in response to: detecting of one or more stopped vehicle, detecting one or more vehicles in an emergency lane; detecting an emergency vehicle with flashing lights that may be approaching the autonomous vehicle; motion in response to detecting on or more large vehicles approaching, adjacent to, or soon, to be adjacent to the autonomous vehicle; motions or actions in response to pedestrians, bicyclists, and the like after identification and classification of such actors; motions or actions in response to curved or banked portions of the roadway; and/or motions in response to identifying on and off ramps on highways or freeways, encountering an intersection; execution of a merge into traffic in an adjacent lane or area of traffic; detection of need to clean one or more sensor and the cleaning of the appropriate sensor; identification of law enforcement/emergency vehicles and personnel and compliance with associated instructions or regulations; execution of minimal risk condition maneuvers when needed; and identification of road debris or unknown objects; and the like. Other features of an autonomous truck may include those actions or features which are needed for any type of maneuvering, including that needed to accomplish the features or actions that are reactionary, listed above.

Supporting features may include: changing lanes safely; operating turn signals on the autonomous truck to alert other drivers of intended changes in motion; biasing the autonomous truck in its lane (e.g., moving away from the center of the lane to accommodate the motions or sizes of neighboring vehicles or close objects); ability to maintain an appropriate following distance; the ability to turn right and left with appropriate signaling and motion, and the like. Supporting features may also include: the ability to navigate roundabouts; the ability to properly illuminate with on-vehicle lights as-needed for ambient light and for compliance with local laws; apply the minimum amount of deceleration needed for any given action; determine location at all times; adapting dynamic vehicle control for trailer load distributions, excluding wheel adjustment; launching (reaching target speed), accelerating, stopping, and yielding; operate on roadways with bumps and potholes; enter a minimal risk condition (MRC) on roadway shoulders; access local laws and regulations based on location along a route; operate on asphalt, concrete, mixed grading, scraped road, and gravel; ability to operate in response to metering lights/signals at on-ramps; operate on a roadway with a width up to a pre-determined width; able to stop at crosswalks with sufficient stopping distance; navigate two-way left turn lanes; operate on roadways with entry and exit ramps; utilize the vehicle horn to communicate with other drivers; and the like. One or more features and/or one or more supporting features described in this patent document may combined and can be performed by the in-vehicle control computer in an autonomous truck.

In some embodiments, the actions or features may be considered supporting features and may include: speed control; the ability to maintain a straight path; and the like. These supporting features, as well as the reactionary features listed above, may include controlling or altering the steering, engine power output, brakes, or other vehicle control subsystems 146. The reactionary features and supporting features listed above are discussed in greater detail below.

III. Flashing Emergency Vehicles

When travelling toward or being approached by a vehicle with flashing lights, such as a tow truck, ambulance, fire truck, or law enforcement vehicle, an autonomous vehicle may be able to properly identify the vehicle and react appropriately. In some instances, the autonomous vehicle may move into the right-most lane or a shoulder and slow down to allow an emergency vehicle with flashing lights to pass. The sensor systems on the autonomous vehicle may indicate that an emergency vehicle with flashing lights is approaching or being approached (e.g., the autonomous vehicle is driving toward a stationary emergency vehicle with flashing lights). The VCU in the autonomous vehicle and/or an oversight system may determine what course of action should, or could, be taken by the autonomous vehicle as it encounters an emergency vehicle with flashing lights. For example, a second or additional trajectory related information for the autonomous vehicle may be trajectory related information that is determined for an autonomous vehicle while it encounters a flashing EV during operation according to original or current trajectory related information (e.g., "first" trajectory related information), and the second trajectory related information may be determined based on various factors, context, scenarios, and the like described herein. In various embodiments, trajectory related information may include a set of points on which the autonomous vehicle may be caused to travel and a speed, acceleration, deceleration, or the like according to which the autonomous vehicle may travel on the set of points. In some examples, trajectory related information may include an expected speed for the autonomous vehicle at each of the set of points.

III.(a) Definition of Flashing EV

A flashing emergency vehicle (EV) may be characterized as a vehicle having at least one lighting lamp exhibiting a red or red and blue light.

III.(b) Detection of Flashing EV

In various embodiments, an autonomous vehicle may react to a flashing EV no later than a pre-determined distance before reaching the flashing EV, unless the flashing EV is initially occluded and undetectable. In some examples, the pre-determined distance may be between approximately 250 feet and approximately 1000 feet, between approximately 300 feet and approximately 750 feet, or between approximately 450 feet and 550 feet. In some examples, the pre-determined distance may be approximately 500 feet.

In various embodiments, an autonomous vehicle may react to flashing EVs that may be: in front of the AV and completely stopped, in front of the AV and moving in the same direction of travel, behind the AV and moving in the same direction of travel, and in front of the AV and moving in the opposite direction of travel on the same roadway/carriageway. In various embodiments, a carriageway may be defined as the width of a roadway on which a vehicle is not restricted by any physical barriers or separation to move laterally.

III.(c) Lane Change Priority

Lane change intentions or deniers that are induced by the detection of a flashing emergency vehicle may be prioritized as a critical safety action. Lane change deniers are conditions which will cause the autonomous driving system to prohibit the autonomous vehicle from making a lane change. Lane change intentions are conditions which will cause the autonomous driving system to favor the autonomous vehicle making a lane change.

III.(d) Flashing EV—Moving on Shoulder

For a flashing emergency vehicle that is moving on a shoulder of a highway, an autonomous vehicle may follow a pre-determined strategy that may include a lane change strategy.

When unable to pass with one full lane between itself and a flashing emergency vehicle that is moving on the shoulder of a highway, an autonomous vehicle may slow down according to a predefined strategy. For example, the predefined strategy may define a deceleration according to which the autonomous vehicle may slow down and/or may include instructions to be sent to one or more devices (e.g., a brake unit) on the autonomous vehicle to cause the autonomous vehicle to slow down according to a defined deceleration.

An autonomous vehicle may follow various strategies, logic, processes, operations, and the like described in Section VIII when determining whether to pass or allow a flashing emergency vehicle that is moving on the shoulder to cut into the lane in which the autonomous vehicle is operating.

When unable to pass with one full lane between itself and a flashing emergency vehicle that is moving on the shoulder of a highway, an autonomous vehicle may predict whether or not the flashing EV will cut in front of the autonomous vehicle. The autonomous vehicle may determine a prediction of an emergency vehicle cutting in based on the signaling of the emergency vehicle, biasing, and/or changing speed of the emergency vehicle. Upon determination that an EV is attempting to merge-in, the autonomous vehicle may decelerate at a normal rate (e.g., in the range of 1 to 2 m/s$^2$) such that the autonomous vehicle is travelling 10 MPH or more below the speed of the emergency vehicle, thus allowing the EV to cut-in on the autonomous vehicle.

III.(e) Flashing EV—Stopped on Roadway

For a flashing emergency vehicle that is stopped on the highway (shoulder or non-shoulder area), an autonomous vehicle may leave at least one full lane between itself and the emergency vehicle, unless a lane change is not possible or is denied.

When the autonomous vehicle has at least one full lane between itself and a flashing emergency vehicle that is stopped on the roadway, the autonomous vehicle may pass the flashing EV with a pre-determined maximum speed that is under the speed limit of the roadway. For example, the pre-determined maximum speed may be 10 miles per hour under the speed limit of the roadway.

When the autonomous vehicle has at least one full lane between itself and a flashing emergency vehicle that is stopped on the roadway, the autonomous vehicle may pass the flashing EV with a speed less than a pre-determined velocity above the average speed of non-emergency non-stationary vehicles that are within a pre-determined distance of the autonomous vehicle and that are traveling in the same direction on the roadway.

Lane change deniers associated with a flashing EV that is stopped may remain in effect from the point in time when the flashing EV is detected until the point in time when the rearmost point of the autonomous vehicle (including a trailer, if applicable) passes the frontmost point of the flashing EV.

Lane change intentions associated with a flashing EV that is stopped may remain in effect from the point in time when the flashing EV is detected until the point in time when the frontmost point of the autonomous vehicle passes the rearmost point of the flashing EV.

When there are multiple flashing EVs that are stopped on the roadway, the autonomous vehicle may leave at least one full lane between itself and the flashing EV that is protruding furthest into the roadway, unless a lane change is not possible or is denied. Lane change deniers associated with multiple flashing EVs that are stopped may remain in effect from the point in time when a flashing EV is detected until the point in time when the rearmost point of the autonomous vehicle (including a trailer, if applicable) passes the frontmost point of the last flashing EV. Lane change intentions associated with multiple flashing EVs that are stopped may remain in effects from the point in time when a flashing EV is detected until the point in time when the frontmost point of the autonomous vehicle passes the rearmost point of the last flashing EV.

When unable to pass with one full lane between itself and a flashing emergency vehicle that is stopped on the roadway, an autonomous vehicle may slow down according to a pedestrian slow down strategy unless otherwise directed by local regulations.

For example, when unable to pass with one full lane between itself and the flashing EV, the autonomous vehicle may slow down by at least a pre-determined amount when the speed limit of the roadway is at or above a pre-determined threshold, and the autonomous vehicle may slow down by a second or different pre-determined amount when the speed limit of the roadway is below the pre-determined threshold. In some examples, the pre-determined threshold may be 25 miles per hour. In some examples, the pre-determined threshold may be based on local regulations or regulations that govern the roadway on which the autonomous vehicle is operating.

The lateral separation distance in the passing strategy used may be measured from the widest point of the autonomous vehicle to the widest point of the flashing emergency vehicle.

III.(f) Flashing EV—Opposite Direction of Travel

When a flashing emergency vehicle is approaching from the opposite direction of travel on the same carriageway, an autonomous vehicle may gradually slow down until the emergency vehicle has passed and may position itself parallel to and as close as possible to the right-hand edge or curb of the roadway clear of any intersections, unless the autonomous vehicle is unable to change lanes.

The critical safety lane change intention(s) or denier(s) associated with a flashing EV that is approaching from the opposite direction may remain in effect from the point in time when the flashing EV is detected until the point in time when the rearmost point of the flashing EV passes the rearmost point of the rearmost point of the autonomous vehicle (including a trailer, if applicable).

III.(g) Flashing EV—EV Approaching AV

When a flashing EV is approaching an autonomous vehicle from behind at an equal or greater speed in the same direction of travel, the autonomous vehicle may yield the right-of-way to the emergency vehicle.

If the autonomous vehicle is in the rightmost lane and a flashing emergency vehicle is approaching the autonomous vehicle and is also in the rightmost lane, the autonomous vehicle may use any available paved section of the shoulder to position itself to the right (out of the driving lanes if possible) and may gradually slow down until the flashing EV has passed. In various embodiments, the autonomous vehicle may decelerate at an area off of the roadway, such as a paved shoulder, an unpaved shoulder, another road, an unpaved area, or the like; for example, an area off of the roadway may generally refer to an area not within a lane of the roadway. When an emergency vehicle with flashing lights is travelling and approaching from directly behind an autonomous vehicle or in a lane to the left of the autonomous vehicle, and the autonomous vehicle is not already in the slow-lane (e.g., the right-most lane in areas where vehicles drive on the right side of the road such as North America), the autonomous driving system may initiate a lane change maneuver within a predetermined time (e.g., 2 seconds, 2.5 seconds, 2.86 seconds, 2.98 seconds, 3 seconds) of detecting the rear-approaching emergency vehicle unless a lane change is not possible or is denied based on other conditions.

Figure 4:
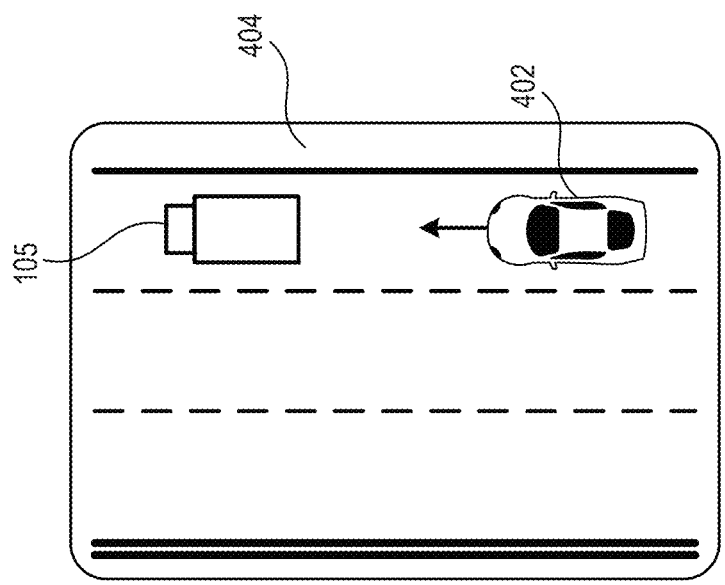
FIG. 4 shows a diagram that illustrates an example scenario involving an autonomous vehicle and a flashing emergency vehicle.

FIG. 4 illustrates this example scenario in which both an autonomous vehicle 105 and a flashing emergency vehicle 402 are in the rightmost lane, with the flashing EV 402 approaching the autonomous vehicle 105. As described, the autonomous vehicle 105 could pull over from its current lane (the rightmost lane) onto a paved shoulder 404 of the road, gradually slowing, until the flashing EV 402 passes the autonomous vehicle 105.

If a flashing emergency vehicle is approaching the autonomous vehicle and the flashing EV is positioned one or more lanes to the right of the autonomous vehicle, the autonomous vehicle may remain in its current lane and gradually slow down until the flashing EV has passed.

Figure 5C:
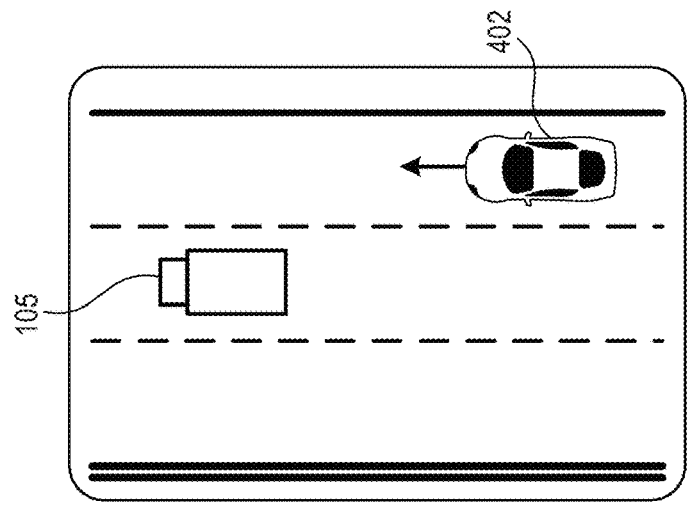
FIGS. 5A, 5B, and 5C each show a diagram that illustrates an example scenario involving an autonomous vehicle and a flashing emergency vehicle.
Figure 5B:
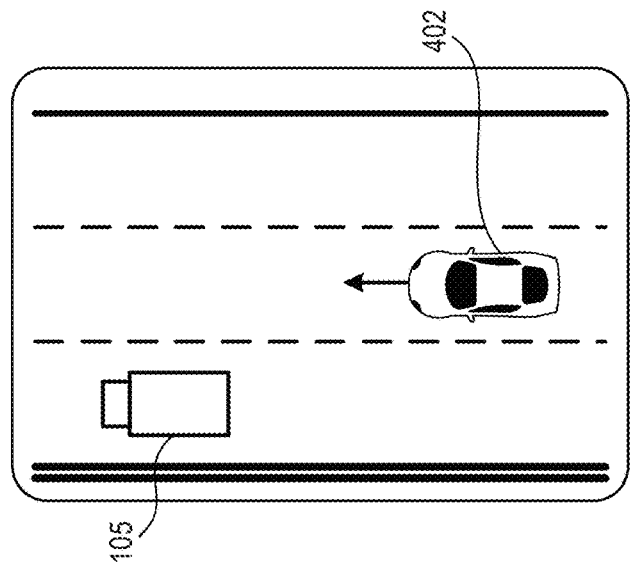
Figure 5A:
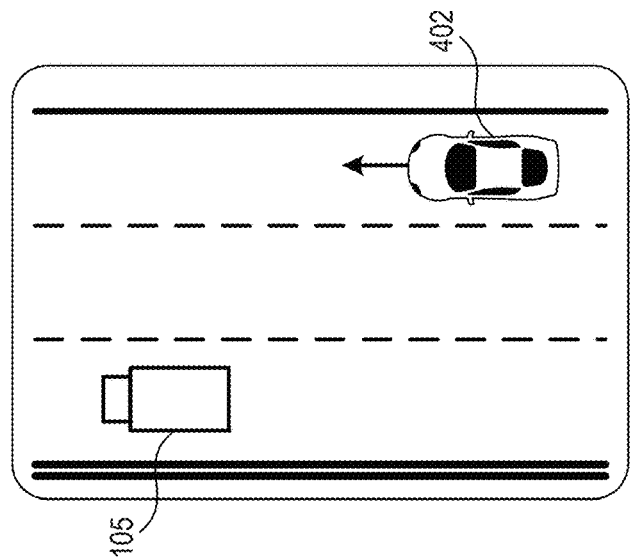
Figure 6C:
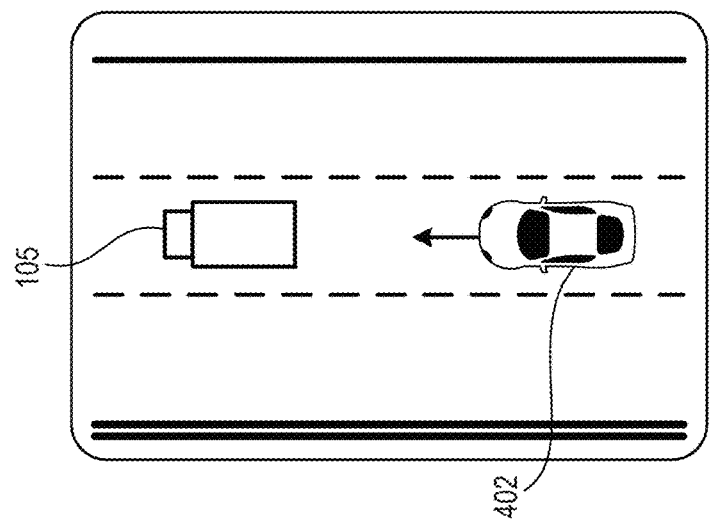
FIGS. 6A, 6B, 6C, 6D, and 6E each show a diagram that illustrates an example scenario involving an autonomous vehicle and a flashing emergency vehicle.
Figure 6B:
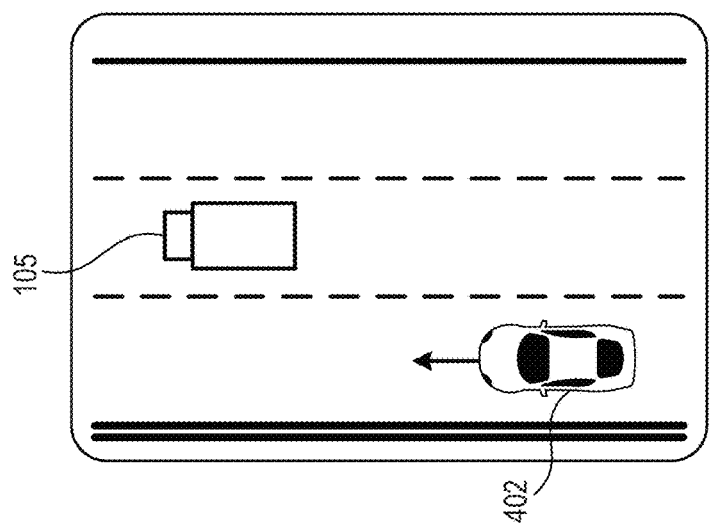
Figure 6A:
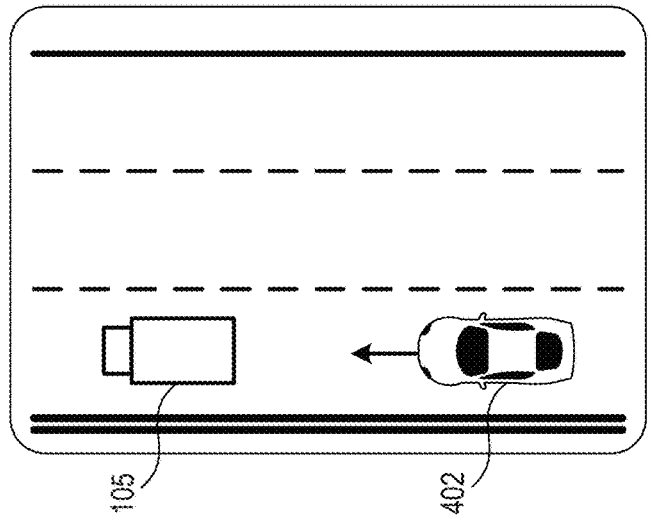
Figure 6E:
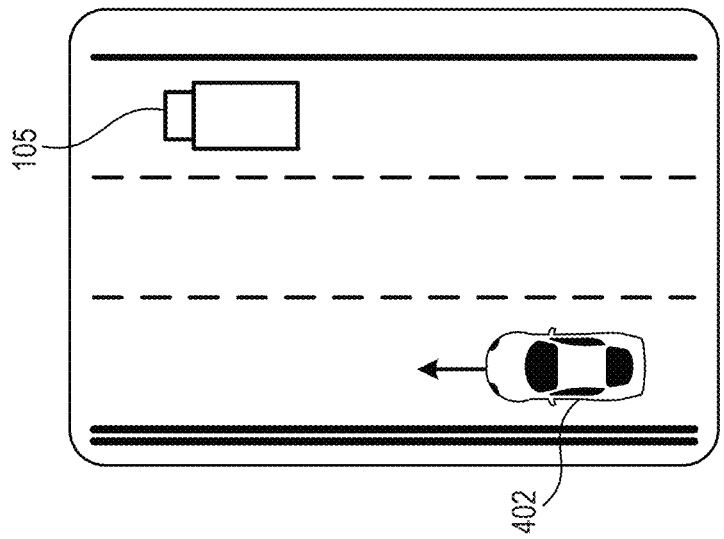
Figure 6D:
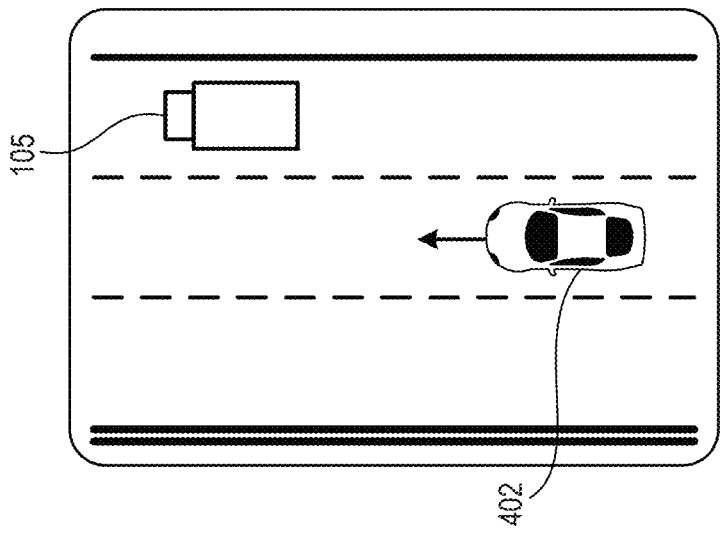

FIGS. 5A-5C illustrate example scenarios in which the flashing EV 402 is approaching the autonomous vehicle 105 and the flashing EV 402 is positioned one or more lanes to the right of the autonomous vehicle 105. In each of the illustrated scenarios of FIGS. 5A-5C, the autonomous vehicle 105 could remain in its current lane until the flashing EV 402 passes the autonomous vehicle 105. In various embodiments, the autonomous vehicle 105 may gradually slow down while remaining in its current lane until the flashing EV 402 passes.

If a flashing emergency vehicle is approaching the autonomous vehicle and is not in the example scenarios described above and illustrated in FIG. 4 and FIGS. 5A-5C, then the autonomous vehicle may position itself in the rightmost lane and may gradually slow down until the emergency vehicle has passed.

FIGS. 6A-6E illustrate example scenarios in which the flashing EV 402 is approaching the autonomous vehicle 105 and in which the flashing EV 402 and the autonomous vehicle 105 are not both in the rightmost lane and in which the flashing EV 402 is not in a lane that is one or more lanes to the right of the autonomous vehicle 105. In each of the illustrates scenarios of FIGS. 6A-6E, the autonomous vehicle 105 could move to the rightmost lane and gradually slow down while in the rightmost lane until the flashing EV 402 has passed the autonomous vehicle 105.

The critical safety lane change intention(s) or denier(s) associated with a flashing EV that is approaching an autonomous vehicle may remain in effect from the point in time when the flashing EV is detected until the point in time when the rear bumper of the flashing EV passes the front bumper of the autonomous vehicle.

III.(h) Flashing EV—AV Following Flashing EV

When an autonomous vehicle is behind a flashing EV that is moving and traveling on the same carriageway in the same direction of travel, the autonomous vehicle may avoid passing the flashing EV. The autonomous vehicle may maintain its longitudinal distance from the emergency vehicle or a distance of at least a predetermined length (e.g., 400 feet, 500 feet), unless the emergency vehicle is in the process of transitioning to a stopped (i.e., static) state. The autonomous vehicle may detect that the emergency vehicle is in the process of transition to a stopped or static state based of determining a deceleration or other behavior of the emergency vehicle. For example, the autonomous vehicle may detect that the emergency vehicle is in the process of transitioning to a stopped state based on a deceleration of the emergency vehicle for at least a predetermined amount of time (e.g., two seconds, five seconds, ten seconds) past a predetermined threshold velocity (e.g., fifty miles per hour, forty miles per hour, thirty miles per hour).

If a moving flashing emergency vehicle transitions to a static flashing emergency vehicle in any of the middle lanes of the carriageway, an autonomous vehicle may stop, regardless of lane, and wait for the flashing EV to move off the carriageway, to transition to the left or rightmost lane of the carriageway, or to continue down the carriageway.

If a moving flashing emergency vehicle transitions to a static flashing emergency vehicle in the left or rightmost lane (or shoulder) of a multilane carriageway, an autonomous vehicle may follow the example strategies outlined in Section III.(e) in order to pass. Alternatively, or additionally, when the emergency vehicle is moving from an emergency lane or shoulder area on the same carriageway and in the same direction of travel as an autonomous vehicle, and the autonomous vehicle is approaching the emergency vehicle from behind, the autonomous vehicle may avoid changing lanes in a way that would place it in a lane adjacent to the emergency lane in which the emergency vehicle is currently travelling. This type of action, or rather inaction, is to minimize the probability of the emergency vehicle cutting in front of the emergency vehicle as it merges into the lanes of normal traffic.

When autonomous vehicle is behind a moving flashing emergency vehicle traveling on the same carriageway in the same direction of travel, the autonomous vehicle may maintain at least a threshold longitudinal distance from the EV.

III.(i) Flashing EV—Memory

An autonomous vehicle may retain in memory, for a pre-determined minimum amount of time, the presence of a flashing emergency vehicle that is later fully or partially occluded from view.

III.(j) Flashing EV—Yielding and Intersection Constraint

An autonomous vehicle may avoid stopping within an intersection when slowing down and yielding for a flashing emergency vehicle.

IV. Following Distance

An autonomous vehicle may be able to determine a safe following distance and adjust velocity (e.g., acceleration or braking) to maintain the safe, predetermined threshold distance between the autonomous vehicle and a vehicle ahead.

IV.(a) Minimum Following Distance

An autonomous vehicle may maintain a minimum following distance to any leading NPCs (non-player character vehicles, such as a manually operated vehicle) at any speed in order to allow the autonomous vehicle enough space to leave the lane whether while in motion or stopped. By maintaining a minimum following distance, the autonomous vehicle has room to avoid a collision by either coming to a velocity, including a complete stop, such that the autonomous vehicle is not expected to collide with a vehicle ahead of the autonomous vehicle. The collision avoidance may include a change in trajectory out of the current lane of travel and into a shoulder or other area outside of the roadway (e.g., truck runaway road or ramp), and the minimum following distance may be defined to enable changes in trajectory out of the current lane without colliding with the leading NPC.

IV.(b) Recommended Following Distance

An autonomous vehicle may maintain a recommended following distance measured from a frontmost point of the autonomous vehicle to the rearmost point of a leading NPC for safety and efficiency. The recommended following distance may be the sum of an efficiency buffer, a minimum gap, and the minimum following distance.

The minimum gap is the gap that ensures a critical stopped distance is maintained between the autonomous vehicle and the rear of a vehicle directly in front of it. The critical stopped distance allows for the autonomous vehicle to safely stop when the vehicle ahead of it comes to an abrupt stop (e.g., brakes suddenly). The minimum gap may be a conservative distance that takes into account the reaction time of the autonomous driving system of the autonomous vehicle, as well as the reaction time of the braking system, the deceleration of the autonomous vehicle considering physical aspects including the cargo and vehicle type, the speed of the autonomous vehicle, and the speed of the vehicle directly ahead of it.

The efficiency buffer is a distance defined when the autonomous vehicle is in a steady-state cruising condition. The efficiency buffer allows the autonomous vehicle to minimize change in speed (i.e., acceleration and deceleration) while maintaining a constant speed so that the autonomous vehicle can keep a following distance that is greater than the minimum gap while reacting to changes in speed by the vehicle directly in front of the autonomous vehicle. In some examples, a recommended following distance may be greater than the minimum following distance for the leading NPC.

IV.(c) Steady State Cruising Definition

Steady state cruising may be defined as when an autonomous vehicle is driving with no safety critical events, and above the speed defined by a predetermined steady-state velocity, and does not experience acceleration or deceleration with an absolute value greater than value defined by a predetermined steady-state threshold acceleration. The predetermined steady-state velocity may be tunable and may have a predetermined nominal value (e.g., 20 MPH, 25 MPH (11.28 m/s), 30 MPH). The steady-state threshold acceleration may be tunable and have a predetermined nominal value (e.g., 2 m/s$^2$, 3 m/s$^2$, 4 m/s$^2$). In some embodiments, the steady-state velocity may be pre-determined as part of mission or route information provided to the autonomous vehicle (e.g., by an oversight system).

IV.(d) Efficiency Buffer

During steady state cruise, the system may continuously define an efficiency buffer that allows an autonomous vehicle to minimize acceleration or deceleration while maintaining a constant speed to keep a following distance more than the minimum gap when reacting to changes in speed by the leading vehicle.

IV.(e) Minimum Following Distance for Traffic Jams

When following a vehicle in heavy traffic under the steady state speed as defined by a predetermined velocity (e.g., 20 MPH, 25 MPH (11.28 m/s), 30 MPH), an autonomous vehicle may keep a following distance with the leading vehicle of at least predetermined distance (e.g., 6 meters, 7 meters, 8 meters, 9 meters, 10 meters) such that the autonomous vehicle would have sufficient room to turn and pass the vehicle in the case that the vehicle comes to a complete stop.

IV.(f) Minimum Following Distance for Pedestrians and Cyclists

If an autonomous vehicle cannot pass a pedestrian or cyclist while travelling on local roads given the example constraints described in Section XII, the autonomous vehicle may maintain a minimum following distance (e.g., 4 meters, 5 meters, 6 meters, 7 meters) to the leading pedestrian or cyclist of at least a predetermined distance and match the speed of the pedestrian or cyclist.

The autonomous vehicle may stop for pedestrians on the highway if unable to change lanes to avoid the pedestrian due to possible pedestrians being law enforcement officers.

IV.(g) Minimum Following Distance for Vehicles

An autonomous vehicle may keep a following distance with the leading vehicle of at least a predetermined distance (e.g., 8 meters, 9 meters, 10 meters, 11 meters) such that the autonomous vehicle would have sufficient room to change lanes and pass the vehicle in overtaking scenarios.

IV.(h) Minimum Following Distance for Nighttime

The minimum following distance to a leading NPC may be increased to at least a predetermined minimum night distance (e.g., 12 meters, 15 meters, 18 meters) during nighttime to account for limitations in visibility. Times considered to fall within nighttime may be predetermined.

IV.(i) Minimum Following Distance for Poor Weather

The minimum following distance to a leading NPC may be increased to at least a predetermined distance (e.g., 15 meters, 18 meters, 20 meters, 23 meters, 25 meters) for poor weather to account for limitations in visibility and traction.

IV.(j) Critical Following Distance

An autonomous vehicle may maintain a critical following distance of at least a pre-determined distance to any leading NPC under any condition to prevent collision and ensure that the vehicle directly in front of the autonomous vehicle is within sensor field of view. The predetermined critical following distance may be a tunable value with a nominal value of 3 meters, 4 meters, or 5 meters or more.

The critical following distance is greater than the critical stopped distance (e.g., 0.75 meters, 1 meter, 1.25 meters, 1.5 meters, 2 meters), described with respect to the Recommended Following Distance. Brakes may be engaged by the autonomous vehicle during travel to ensure that there is a suitable gap between the vehicle directly ahead of it in the same land of travel and itself (i.e., the autonomous vehicle). The critical following distance may be less than the recommended following distance.

IV.(k) Stopped Distance

An autonomous vehicle may be able to bring itself to a stop as the leading NPC comes to a stop and maintain a stopped distance with the leading NPC. The stopped distance may be the distance that is between the rear of a vehicle ahead of an autonomous vehicle and the front end of the autonomous vehicle when it stops as a reaction to the vehicle ahead coming to a stop.

IV.(l) Recommended Stopped Distance

When both a leading NPC and an autonomous vehicle are coming to a stop, the autonomous vehicle may keep a stopped distance of at least a predetermined distance (e.g., 4 meters, 5 meters, 6 meters, 7 meters, 8 meters) so that the autonomous vehicle has enough space to change lanes from stationary and prevent other vehicles from cutting in. For example, after coming to a stop to avoid collision with the vehicle ahead, the autonomous vehicle will have enough room to maneuver around the vehicle ahead (i.e., the stopped vehicle) if needed or desired.

IV.(m) Critical Stopped Distance

In safety critical or evasive scenarios, the system may be able to stop with a distance of at least a predetermined critical stopping distance (e.g., 0.75 meters, 1 meter, 1.25 meters, 1.5 meters, 2 meters) to the vehicle in front of the autonomous vehicle so that impact is avoided.

IV.(n) Minimum Gap Definition

In various embodiments, a minimum gap may generally be defined as a gap that ensures that a critical stopped distance is maintained in the event that the vehicle in front of an autonomous vehicle immediately brakes and comes to a complete stop.

When determining the minimum gap, the reaction time of the autonomous system is taken into account, along with the reaction time of the braking system, the maximum available deceleration of the autonomous vehicle, an estimate of the maximum possible deceleration of the vehicle in front of the autonomous vehicle based on the model and load of that leading vehicle, as well as the speed of both the autonomous vehicle and the vehicle in front of it.

For example, given an autonomous vehicle with a maximum possible deceleration due to its braking capacity and load, as well as a known braking system reaction time, the minimum gap will increase if the vehicle ahead of the autonomous vehicle is a light-weight passenger vehicle capable of stopping in a relatively short period of time, as compared to the scenario when the vehicle ahead of the autonomous vehicle is a flatbed truck or other heavy duty vehicle with a weighty cargo (e.g., another vehicle, a load of bricks).

IV.(o) Maintain a Minimum Gap

An autonomous vehicle may dynamically adjust and maintain a minimum gap to the leading NPC based on the autonomous vehicle's speed of travel and system reaction time.

The autonomous vehicle may increase following distance at higher speeds and decrease following distance at lower speeds.

The autonomous vehicle may account for the braking capability of the type of leading NPC (i.e., the vehicle ahead of the autonomous vehicle). In various embodiments, a leading NPC or a leading vehicle may be associated with a predetermined maximum deceleration (e.g., braking capability) based on a type or classification. For instance, vehicles of different body types, such as sedans, trucks, sport utility vehicles, or the like, may be associated with different predetermined maximum decelerations.

IV.(p) Safest Plan with Minimum Gap

If the autonomous vehicle must enter the minimum gap, the autonomous vehicle may maintain a gap growth rate to the leading NPC with a velocity differential to the leading NPC of at least a predetermined velocity until the minimum gap is restored.

IV.(q) Restore the Minimum Gap

If a vehicle cuts or merges into a current lane of the autonomous vehicle and is within the minimum gap, the autonomous vehicle may maintain a gap growth rate to the leading NPC with a velocity differential of at least a predetermined value until the minimum gap is restored.

V. Turning Right and Left at Intersections

An autonomous vehicle may be able to execute right- and left-hand turns, as needed, to progress along its trajectory or route in a safe manner. Such actions may include adjusting the width of a turn, preventing block an intersection during execution of a turn, and the like. Some intersections of roadways have traffic lights to control the flow of vehicles, pedestrians, and cyclists. In the following passages, there may be reference to intervals such as the yellow change interval, red clearance interval, and green time. The duration of these intervals or phases for traffic lights are determined by engineers for each jurisdiction and may vary depending on the local laws as well as depending on the geometry of the intersection. For example, in California, it is legal for a vehicle to be in an intersection while the traffic light is red if it entered the intersection when the light was yellow (see California vehicle code 21452).

Further, the turns in intersection are described herein with reference to driving conventions where vehicles travel on the right-hand side of a roadway and opposing traffic travels on the left-hand side of the roadway (e.g., North America). In such areas with these driving conventions, right turns at intersections are usually more facile and may even be allowed during red light intervals/periods. Conversely, left turns are more precarious as the require passing through a lane of on-coming traffic. In areas where the driving conventions are reversed (e.g., such as in Australia, Japan, and the United Kingdom), the descriptions below may be adapted such that descriptions of turning left may be applied to right turns, and descriptions of turning right may be applied to left turns at intersections.

V.(a) Blocking Intersection

An autonomous vehicle may avoid entering an intersection for a turn if the autonomous vehicle predicts that it will not completely exit the intersection by the end of the red clearance interval. The red clearance interval may include the time between when a traffic light changes from yellow to red (e.g., yellow change interval) and the traffic light directing traffic in the cross-street turns green. This clearance interval allows time for vehicles that entered the intersection of the streets while the light was yellow and changed to red to clear the intersection. Red clearance intervals typically range between 0.5 to 2.0 seconds, and most do not exceed 6 seconds. Yellow change interval for traffic lights may typically be 3 to 6 seconds, but when traffic is known to approach an intersection at higher speeds, the yellow change interval may have a longer duration. In some embodiments, a red clearance interval for an intersection may be included in map data for the area that includes the intersection. Generally, in some embodiments, map data may include intersection data for each intersection located in the area described by and associated with the map data, and the intersection data for an intersection may include a presence of traffic lights, a red clearance interval, intersection geometry information (e.g., width, dimensions, polygonal shape), a yellow change interval, or the like.

V.(b) Wide Right Turn—Preferred Turning Trajectory

When turning right at an intersection and a wide turn is necessary, the system may prefer to pull wide near the end of the turn as opposed to the beginning of the turn. This decision may be based upon the configuration of the vehicle, particularly if it is a tractor-trailer vehicle. For such vehicles, factors such as the length of the trailer, the type of connection at the fifth wheel, and the loading of the trailer may influence turning decisions. Further, the autonomous vehicle may decide that swinging into another lane is necessary to accomplish a turn at an intersection. When this trajectory is selected by the system, the autonomous vehicle will preferentially yield right-of-way to other road users (e.g., other vehicles, cyclists, pedestrians) in the target lane or the lane into which the autonomous vehicle will swing. For example, the autonomous vehicle may perform the trajectory once the autonomous vehicle has determined that the lane into which the autonomous vehicle will swing is clear of vehicles.

V.(c) Traffic Light Detection

The traffic light detection range may be at least a predetermined distance (e.g., 150 meters, 175 meters, 200 meters, 225 meters, 250 meters). The map used by the autonomous driving system may indicate where traffic lights are known to be located. This knowledge may aid the autonomous driving system to identify traffic lights and determine the status of the light as it approaches an intersection. Further, the autonomous driving system may make adjustments as needed to its data collection or data processing, such as utilizing a specific module, to determine the status of traffic lights as the autonomous vehicle approaches an intersection.

V.(d) Method of Wide Left Turn

When the autonomous vehicle is encountering the tight left turn, the system may consider swinging right to make the left turn safely. Further, in such wide left-turn situations the autonomous vehicle may decide that swinging into another lane is necessary to accomplish a turn at an intersection. For example, the autonomous vehicle may determine that a normal turning trajectory without swinging may not be feasible due to obstructions located around the intersection and road segments. When a swinging trajectory is selected by the system, the autonomous vehicle will preferentially yield right-of-way to other road users (e.g., other vehicles, cyclists, pedestrians) in the target lane or the lane into which the autonomous vehicle will swing. For example, the autonomous vehicle may wait until the lane into which the autonomous vehicle will swing is clear of vehicles before performing the swinging trajectory.

V.(e) Multiple Left Turn Lanes

When the autonomous vehicle is encountering multiple turning lanes for left turns, the system may prefer taking the right turn lane to finish the left turn. This preference may reduce a likelihood of certain autonomous vehicles colliding or contacting intersection infrastructure (e.g., road curbs, sidewalks, light posts), such certain autonomous vehicles including tractor-trailer vehicles, other vehicles having a length that may require a greater turning radius to accomplish a turn, and vehicles that may swing wide during turns, for example.

V.(f) Unprotected Turning—Blocked View

When the necessary perception view is blocked in unprotected turning, the system may creep forward to adjust the position to get the necessary perception view, then make the turning decision. An example turning decision may be made in accordance with Section V.(h) (Unprotected Turning TTC).

V.(g) Enter the Intersection with Unclear Off-Tracking Area

The system could enter the intersection with unclear off-tracking areas (but not necessary to finish the turn) as long as no impact with the object in the off-tracking area in evasive scenarios.

V.(h) Unprotected Turning

When performing an unprotected turn at a signalized intersection or turning at a non-signalized intersection where the autonomous vehicle must yield the right of way, the autonomous vehicle may leave enough time for the autonomous vehicle to finish the turn before oncoming vehicles arrive. The time calculation may take the length of the autonomous vehicle (e.g., including a trailer length) into consideration. For example, the time to turn-left for a truck with 53' trailer may be around 10-20 seconds depending on the loads and intersection size. The arrival time of oncoming vehicles could consider the vehicles' arriving distance and the speed. The autonomous vehicle may not block the oncoming vehicles with the right-of-way.

V.(i) Unprotected Turning in Heavy Traffic

In heavy traffic, the movements of vehicles surrounding the autonomous vehicle may change from the usual patterns, as drivers may speed to get through intersections and cross-traffic may be more likely to accelerate through the intersection during the yellow change interval, or conversely, drivers may not have sufficient distance to reach the speeds attainable during lighter traffic and so may approach intersections more slowly.

For unprotected turn in the intersection in heavy traffic, the time the system reserved for the autonomous vehicle to finish the turn may allow the oncoming vehicle to decelerate at a comfortable rate. For reference, the comfortable deceleration rate for vehicles may be less than a predetermined rate (e.g., less than $3.4 \text{ m/s}^2$).

V.(j) Yielding Behavior When Turning

When turning at an intersection, the autonomous vehicle may yield the right-of-way to traffic in all lanes that are intersected by the autonomous vehicle's planned trajectory and are not required to stop. Yielding in this way may prevent erratic or non-compliant behavior by surrounding vehicles faced with an autonomous vehicle turning.

The autonomous vehicle may yield to vehicles doing U-turns onto the autonomous vehicle's planned target lane.

The autonomous vehicle may yield to adjacent lanes that are crossed due to the autonomous vehicle's extra wide turning radius.

In various embodiments, to yield means that the autonomous vehicle may be able to finish its maneuver without causing vehicles with the right-of-way to have to slow down.

V.(k) Turning Speed at Intersections

When turning at an intersection, the autonomous vehicle may drive at a speed and turning angle that maintains truck stability and prevents the truck from rolling over.

When turning at an intersection, the autonomous vehicle's speed may resemble the speed at which an experienced human driver would make the turn. In some embodiments, the autonomous vehicle may drive at a speed that is determined based on data describing surveyed speeds of experienced human drivers when making a similar turn. In some embodiments, a machine learning model that is trained on data describing experienced human driving behavior at a turn is used to determine a speed for the autonomous vehicle at the intersection.

V.(l) Turn Signals Predetermined Distance Ahead

The system may use signal lights at least a predetermined distance (e.g. 75 feet, 85 feet, 95 feet, 100 feet, 110 feet, 125 feet) away from the stop line in the intersection to warn neighboring vehicles whenever deciding to make a turn. The system may turn off the signal lights when fully completing the turning.

V.(m) Strategies when Turning Left

If the autonomous vehicle is going to turn left within the intersection, the system may yield to another vehicle that is approaching from the opposite direction. The decision to yield may be a predetermined default condition. Alternatively, or additionally, the autonomous driving system may operate in a condition where the velocity of the vehicle travelling in the opposite direction to the autonomous vehicle may be factored into the decision making process of whether or not to yield while making a left turn. In some situations, the status of the traffic lights may also be a factor in determining whether or not to yield while making a left turn.

V.(n) Identify the Correct Target Lane

When turning at an intersection, the autonomous vehicle will select an appropriate lane and may keep the same relative lane during and after the turn. For example, the autonomous vehicle may be located in the rightmost lane prior to arriving and turning at the intersection, and the autonomous vehicle will select the rightmost lane of the road segment past the intersection (onto which the autonomous vehicle is turning). In some instances, road segments preceding and succeeding the intersection may include a different number of lanes, and in such example instances, the autonomous vehicle will identify a relative lane based on a lane's position relative to the right-hand side of the road segment. For example, the autonomous vehicle may keep within a lane that is one lane removed (e.g., to the left of) the right-most lane during and after the turn, irrespective of a total number of lanes in the road segments connected by the intersection.

When turning at an intersection leading to a partner's facility (e.g., a distribution center of a retail company or entity), the autonomous vehicle may target any preferred lanes as outlined by the partner.

V.(o) Unprotected Turning Under Green Lights

When doing unprotected left turn under green light, if the autonomous vehicle is the first vehicle on the intersection, the system may creep forward to enter the intersection without impeding the traffic. If the system is unable to finish the left turn under green light, the system could finish it under yellow/red light as soon as possible to minimize the blocking of intersection.

V.(p) Off-Tracking Area

The behavior of a vehicle that is towing a cargo using a trailer, where the wheels or rear of the trailer portion do not follow the path travelled by the driving wheels (e.g., the wheels of the vehicle that receive power from motors or an engine) of the vehicle is termed off-tracking. The determination of an off-tracking area may involve any of the following: the curve calculation (from the start of the turning to the finish of the turning), considering the length of vehicles (including trailers), the off track of the rear wheels, the speed of the vehicle, the location of the fifth wheels and the areas/arcs of the intersections and etc.

V.(q) Off-Tracking Preferred Behavior

The autonomous vehicle may prefer a path where off-tracking of the rear wheels remains within the lane boundaries, unless doing so would risk collision with a nearby vehicle or object. In some embodiments, an autonomous vehicle driving system may be configured to determine which trajectory the driving wheels of the autonomous vehicle must take to keep the rear wheels of the vehicle (including the trailer) within lane boundaries and the system may preferentially do so.

V.(r) Do Not Invade NPC Turning Radius

The autonomous vehicle may avoid invading the opposing traffic's turning radius when yielding to a left-turning NPC at a signalized intersection. In other words, the autonomous vehicle may stay clear enough of the intersection while yielding to allow vehicles travelling in opposite directions to turn left using a normal or expected turning trajectory at an intersection that has traffic lights to aid in traffic control.

VI. Stop Sign Intersections

An autonomous vehicle may be able to identify an intersection with stop signs and react safely, obeying the local regulations associated with such intersections. The autonomous vehicle may be able to determine any of: whether the intersection is an all-way stop, whether one or more directions yield to another, and how many roadways intersect. The actions or reactions that the autonomous vehicle may be able to execute can include: yielding appropriately, waiting for other vehicles to clear the intersection before proceeding, reacting to flashing traffic lights that are equivalent to stop signs, and the like.

VI.(a) Stop Sign Intersections—Yield to Vehicles that Stopped First

At an intersection where more than one direction of travel is controlled by a stop sign, the autonomous vehicle may yield the right of way to any vehicles that stopped at their respective stop sign at the intersection at the same time or prior to the autonomous vehicle stopping at its stop sign.

VI.(b) Stopped Vehicles Yielding Definition

When yielding to an NPC (e.g., non-player character, in other words a vehicle that is not the autonomous vehicle) that was previously stopped at a stop sign intersection, the autonomous vehicle may proceed through the intersection only if the NPC has cleared the intersection. The NPC may clear the intersection once the NPC has traveled across the intersection and is positioned/operating at a point opposite of the intersection from its original position.

VI.(c) Stop Sign Intersections—Yield to Through Traffic

At an intersection controlled by a stop sign, the autonomous vehicle may yield the right of way to any vehicles that are traveling in lanes that are not required to stop and whose paths are intersected by the autonomous vehicle's planned path.

VI.(d) Through Traffic Yielding Definition

At an intersection controlled by a stop sign, the autonomous vehicle may proceed through the intersection only if any through traffic NPC would be expected to decelerate on average less than a predetermined rate/acceleration (e.g., in $m/s^2$) in order to allow the autonomous vehicle to transition to its target lane.

A determination of an NPC's expected average deceleration may take into account the speed of the NPC, the distance of the NPC from the autonomous vehicle, duration of the autonomous vehicle's turn, and the average human reaction time.

VI.(e) Stopping Behavior at Stop Signs

At an intersection controlled by a stop sign, the autonomous vehicle may make a complete stop for the sign in accordance with example requirements described in Sections VI.(i) (Crosswalk Lines), VI.(n) (Stop Lines), and VI.(p) (Stop Signs).

VI.(f) Flashing Red Intersections

When the autonomous vehicle encounters a traffic light at a signalized intersection that is flashing red, the autonomous vehicle may treat the intersection as a stop sign intersection.

VI.(g) Definition of Creeping Forward

Creeping may be defined as the action of moving forward at a rate less than a predetermined velocity (e.g., 3 MPH, 4 MPH, 5 MPH, 6 MPH).

VI.(h) Stop Sign Intersections—TTC Stop

After the autonomous vehicle has made a complete stop for a stop sign at an intersection, the autonomous vehicle may be able to creep forward to a second stop as needed for better perception of cross traffic. This second stop may be known as a TTC stop.

VI.(i) Stopping Location—Crosswalk Lines

For intersections without stop lines but with crosswalk lines, the autonomous vehicle may stop before the autonomous vehicle's front bumper crosses the nearest crosswalk line and no further than a predetermined distance from the crosswalk line.

VI.(j) Stopped Vehicles Yielding—Time Consideration

The autonomous vehicle may wait at least a predetermined number of seconds when yielding for an NPC at a stop sign that is not yielding to through traffic. If the NPC has not attempted to proceed through the intersection within that time, the autonomous vehicle may consider proceeding through the intersection.

VI.(k) Stopping Duration

When stopping for a stop sign intersection, the autonomous vehicle may remain stopped for at least a predetermined time (e.g., at least 1 second, at least 2 seconds, at least 3 seconds, at least 4 seconds, at least 5 seconds or more).

VI.(l) TTC Stop—Stopping Duration

The autonomous vehicle may remain stopped for at least a predetermined time (e.g., at least 1 second, at least 2 seconds, at least 3 seconds, at least 4 seconds, at least 5 seconds or more) at a TTC stop.

VI.(m) TTC Stop—Remain Outside of Driving Lanes of Intersection

When creeping forward for a TTC stop, the autonomous vehicle's front bumper may remain outside of any driving lanes in the intersection.

VI.(n) Stopping Location—Stop Lines

For intersections with stop lines, the autonomous vehicle may stop before the autonomous vehicle's front bumper crosses the stop line and no further than a predetermined distance (e.g., 3 meters, 4 meters, 5 meters, 6 meters) from the stop line.

VI.(o) T-Intersections—Non-Through Lane

When the autonomous vehicle is in a non-through lane at a T-intersection, the autonomous vehicle may treat the intersection as a stop sign intersection, even in the absence of a physical stop sign.

VI.(p) Stopping Location—Stop Signs

For intersections without stop lines or crosswalk lines, the autonomous vehicle may stop before the autonomous vehicle's front bumper reaches the stop sign and no further than a predetermined distance from the stop sign.

VII. Accepting Merging Vehicles

An autonomous vehicle may be able to accept vehicles merging into traffic surrounding the autonomous vehicle. This ability to accept a merging vehicle could extend to more than one vehicle. Also, this ability could include identification of different types of on- and off-ramps. An autonomous vehicle may accept merging vehicles based on determining second trajectory related information while the merging vehicles are detected while operating in accordance with original or current trajectory related information (e.g., "first" trajectory related information). The first and second trajectory related information may each include a set of points on which the autonomous vehicle is expected and caused to travel and one or more speeds, accelerations, or decelerations according to which the autonomous vehicle is expected and caused to travel while on the set of points.

VII.(a) Accept Merge-In Definition

The autonomous vehicle may define accept merge-in as any NPC merging into the current lane of the autonomous vehicle at a merge area where the autonomous vehicle has the right of way.

The autonomous vehicle may consider itself to have the right of way when the autonomous vehicle is on a lane that is not ending or leaving the highway. This may apply to standard on-ramps, k-ramps, and lane ending merges.

VII.(b) Lane Change

An autonomous vehicle may have a non-critical safety lane change intention to change out of the adjacent lane to the merge point when: there are multiple vehicles merging in; there is a large vehicle merging in; there is a vehicle that is predicted to remain slow merging in (and would be in front of the autonomous vehicle); and/or the predicted bumper-to-bumper distance to any NPC at their expected merge time is less than the autonomous vehicle's preferred front gap distance.

VII.(c) Accept Merge Nominal Behaviors and Interactions

An autonomous vehicle may define a set of nominal behaviors to accept merging vehicles, including lane change, accelerating, maintaining speed, and yielding to one or more vehicles.

VII.(d) One Vehicle Merge—Yield

An autonomous vehicle may yield via the minimum deceleration necessary to comply with the example strategies and logic described in Section IV.(q) when the vehicle merging is predicted to intersect with any part of the autonomous vehicle at the merge location.

VII.(e) One Vehicle Merge—Maintain Speed Preference

An autonomous vehicle may prioritize maintaining its current speed and heading when approaching a merge with only one vehicle in the monitoring area on the ramp.

VII.(f) Earliest Merge Location

An autonomous vehicle may predefine in the map the earliest compliant merge location for each merge.

For on-ramp merge scenarios, the earliest merge location may be defined as the end of a gore area which is followed by no lines or dashed white lanes. If a solid white line continues past the gore area, the end transition point of solid white line to dotted white line is the earliest merge location.

For lane ending merge scenarios, the earliest merge location may be defined as the point where the first signage occurs that indicates a lane ending.

VII.(g) Multi-Vehicle Merge—Gap Negotiation

If an autonomous vehicle predicts that one or more vehicles will be parallel or in front of the autonomous vehicle at the merge point, the autonomous vehicle may seek a gap between or behind the merging vehicles. The autonomous vehicle may seek the gap that minimizes total expected reduction in velocity (autonomous vehicle deceleration+target back deceleration).

Target back deceleration may be defined as the expected reduction in velocity of the vehicle that is predicted to be behind the autonomous vehicle at the completion of the merge as measured from its current predicted speed.

VII.(h) Multi-Vehicle Merge—Maintain Speed

If an autonomous vehicle is approaching a merge interaction in its current lane and the autonomous vehicle predicts that the rear bumper of itself (e.g., of the trailer) will be in front of any merging road user at their individual merge points, the autonomous vehicle may continue with no modification to its planned trajectory.

VII.(i) Perception on Ramps

The autonomous vehicle may monitor the speed and velocity of all vehicles on ramps that could arrive at the earliest merge point within a predetermined amount of time (e.g., 3 seconds, 4 seconds, 5 seconds, 6 seconds) or a predetermined amount of curvature (e.g., 125 meters, 150 meters, 175 meters, 200 meters) corrected longitudinal distance of a frontmost point of the autonomous vehicle passing the earliest merge point.

VII.(j) Predict Merge Location

An autonomous vehicle may predict the merge point of each merging or potentially merging vehicle.

The autonomous vehicle may define the merge point for each merging vehicle as the point at which their tires cross into the current lane of the autonomous vehicle.

In cases where there is not a lane line on one side, the autonomous vehicle may use the standard lane width as an assumption for measurement of the merge point.

VII.(k) K-Ramp Accept Merge-In

The autonomous vehicle may navigate K-ramp accept merge-in scenarios using a model to predict whether the vehicle on the K-ramp will merge into the current lane of the autonomous vehicle.

VIII. Accepting Cutting Vehicles

An autonomous vehicle may be able to determine when another vehicle intends to cut into the lane in which the autonomous vehicle is travelling. When another vehicle does cut into the lane in which the autonomous vehicle is travelling, the autonomous vehicle may adjust velocity to allow for safe distance between the vehicles. Further, the autonomous vehicle may be able to detect a traffic jam and anticipate that other vehicles may want to cut-into the lane in which the autonomous vehicle is travelling. Further, the autonomous vehicle may be able to deal with a vehicle that executes an abrupt stop after cutting-into the lane in front of the autonomous vehicle. The autonomous vehicle may deal with the cutting vehicle based on determining and operating according to second trajectory related information, with the original or current trajectory related information while the cutting vehicle is detected being the "first" trajectory related information. In various embodiments, trajectory related information may include a set of points and one or more speeds, accelerations, and/or decelerations according to which the autonomous vehicle may be caused to operate.

VIII.(a) Critical Distance Cut-In

When a vehicle cuts in within the Critical Following Distance, an autonomous vehicle may decelerate at a rate that ensures a gap growth rate (i.e., relative velocity) of a predetermined rate between a frontmost point of the autonomous vehicle and the rear bumper of the cut-in vehicle. The gap growth rage may be in a range between 1 m/s and 3 m/s, such as 2 m/s (4.5 MPH).

VIII.(b) Inside the Minimum Gap Cut-In

If a vehicle cuts-in beyond the Critical Following Distance but within the minimum gap, the autonomous vehicle may follow the example behavior outlined in Section IV.(r).

VIII.(c) Outside Minimum Gap but within Recommended Following Distance Cut-In

If a vehicle cuts-in outside of the minimum gap, the system may adjust its speed to restore the recommended following distance, if necessary. The minimum gap is the distance needed to maintain a critical stopped distance when both an NPC and the autonomous vehicle fully brake.

VIII.(d) Traffic Jam

In a traffic jam, the system may guarantee that a critical distance is not penetrated when accepting cutting-in vehicles.

If the autonomous vehicle stops and an NPC cuts in with a distance lower than the critical distance, the system waits until the vehicle fully cuts in, and after the NPC moves forward to restore the safe following distance in the traffic jam, the autonomous vehicle may begin to move forward.

If the autonomous vehicle is proceeding with a low speed and an NPC cuts in with a distance less than the critical distance, the system takes the minimum required deceleration rate to restore the safe following distance in the traffic jam.

VIII.(e) Maneuvers for Inevitable Crash

When braking for a cut-in vehicle, the system may avoid jackknifing, rolling over, and penetrating an adjacent lane such that a liable accident is caused.

If a collision with the cut-in vehicle is imminent, the system may maximize the available braking while adhering to the above requirement.

VIII.(f) Surrounding Traffic

The system may be able to predict changes to the cut-in vehicles behavior based on surrounding traffic and may adjust its behavior based on this prediction. For example, if the vehicle in front of the cut-in vehicle brakes suddenly, the autonomous vehicle may expect the cut-in vehicle to also brake, leading to the autonomous vehicle adjusting its braking strategy.

VIII.(g) Predicting Cut-In Vehicle

The autonomous vehicle may predict when an NPC (e.g., a surrounding vehicle, a vehicle located in the area surrounding the autonomous vehicle) is attempting to cut in. Factors that may influence the prediction may include but are not limited to: NPCs with signal lights on in the direction facing the current lane of the autonomous vehicle, NPCs biasing toward the current lane of the autonomous vehicle, and NPCs traveling in lanes with an average velocity more than a predetermined amount less than (e.g., 8 MPH slower than the cutting-in vehicle, 10 MPH slower, 15 MPH slower) the current velocity of the autonomous vehicle. For example, if a vehicle in an adjacent lane is travelling 40 MPH and the autonomous vehicle is traveling at 50 MPH and the predetermined amount is 8 MPH, then the autonomous driving system may determine that the vehicle in the adjacent lane is attempting to cut-in. In another example, when a vehicle in an adjacent lane in biasing toward the lane in which the autonomous vehicle is traveling by more than a predetermined amount (e.g., 0.5 meters, 0.75 meters), then the autonomous vehicle may determine that the vehicle in the adjacent lane is attempting to cut-in. A surrounding vehicle that uses indicator lights to signal the desire to change lanes may also be determined by the autonomous driving system to be attempting to cut-in, especially if it the signaling vehicle is biasing toward the lane of travel the autonomous vehicle is currently occupying or when the signaling vehicle is slowing down as described previously.

IX. Merging into Traffic

An autonomous vehicle may be able to merge onto a highway or into traffic safely. The autonomous vehicle may utilize sensor data and computing systems to determine any of the following: when deviation from the original route is needed, when an opportunity to merge in is available, where to merge in, what the intent of one or more vehicles in traffic is, when two lanes merge, and the like.

VI.(a) Route Following—Highway Merge

When merging onto a highway or roadway, an autonomous vehicle may prefer to stay on its intended route when safety is not a concern.

VI.(b) Route Deviation—Highway Merge

When merging onto a highway or roadway, an autonomous vehicle may deviate from its intended route if the cost to stay on the route is greater than the cost to deviate. For example, if staying on the route poses a collision risk to the autonomous vehicle or the nearby vehicles, then the autonomous vehicle may change its route, if possible.

VI.(c) Defining Merge-In Gap

In normal traffic flow excluding a traffic jam, the system may dynamically define the merge-in gap, which is the open space that is increasing and may potentially reach the length of "AV length (e.g., tractor+trailer length)+the minimum gap with the target front vehicle+the minimum gap for the target back vehicle" by the time the autonomous vehicle finishes the merge-in.

VI.(d) Defining Merge-In Point

The merge-in point may be between the gore area and the point where the dashed line disappears. The system may avoid driving over the solid line unless in evasive scenarios. The system may take the target lane vehicle's relative speed, relative acceleration rate, distance to the merge-in point, and the autonomous vehicle's distance to the merge-in point into consideration when deciding the merge-in point.

VI.(e) NPC Intention

When defining the merge-in gap, the system may take the target NPCs' intentions of yielding or passing into consideration. For human drivers, the following factors are considered: relative speed, acceleration/deceleration, relative position (e.g., ahead of or behind the autonomous vehicle).

VI.(f) Zipper Merge-In in Traffic Jam

When merging in a traffic jam, the system may follow a zipper merge rule (e.g. vehicles merging one by one in turn).

VI.(g) Creep Forward in Traffic Jam

If unable to find the merge-in gap in a traffic jam, the system may creep forward to find a potential merge-in gap. If the merge-in gap is increasing, the system may continue to merge in. If the merge-in gap is decreasing, the system may stop and wait for vehicles to yield to autonomous vehicle.

VI.(h) Shoulder Push

In a traffic jam, the system may not allow the autonomous vehicle to be pushed onto the shoulder of the roadway or pushed off of the roadway.

VI.(i) Two Lanes to One Lane

If encountering the two-way lanes to one lane on merging-in ramps, the system may change lane to the final merge-in lane as early as possible to avoid being pushed to the end of the lane.

Definition of the final merge-in lane: Most of the two-to-one on-ramps do not have arrows on the road. But there is a lane close warning sign on each on-ramp road that shows whether its right lane or left lane is going to close. In various embodiments, the autonomous vehicle may detect (e.g., via sensor data, via camera images and/or video, via map data) the lane close warning sign or may determine that a ramp is a two-to-one on-ramp and identify the final merge-in lane.

VI.(j) Turn Signals

The system may turn the turn signal lights on a predetermined amount of time (e.g., between 3 seconds and 30 seconds, such as 5 seconds, 10 seconds, 12 seconds, 15 seconds, or 20 seconds) before the lane change. In evasive scenarios that do not allow for that predetermined amount of time, the system may turn the turn signal lights on once the lane change intention is confirmed. If there are no further requests, the system may turn off the turn signal lights after the lane change maneuver is completely completed.

VI.(k) Match Speed

The system may minimize the absolute value of the relative speed with the target lane before merging in.

VI.(l) Recognize Pass-Intent Vehicles

When merging, the autonomous vehicle may recognize when a vehicle in the adjacent lane intends to accelerate past the autonomous vehicle, in which case the autonomous vehicle may not intend to merge in front of the accelerating vehicle.

X. Detection of Non-Compliant Vehicles

An autonomous vehicle may have the ability to determine when another vehicle is swerving in traffic and react accordingly to continue to drive safely. In some implementations, an autonomous vehicle may be able to detect a non-compliant vehicle that crosses multiple lanes at once, follows too closely, encroaches on the autonomous vehicle's space, oscillates in its spacing from the autonomous vehicle, and the like. Alternatively, or additionally, the autonomous vehicle may keep track of a non-compliant vehicle, that is to say monitor the duration of travel of the non-compliant vehicle in parallel with the autonomous vehicle. The autonomous vehicle may also determine when another vehicle travelling adjacent to it is too close for reaction and act to increase distance. The identification of a non-compliant vehicle by the autonomous vehicle may be based on sensors and systems on the autonomous vehicle, including the vehicle computing unit, or by an oversight system operator. Instructions for how to react to a non-compliant, swerving vehicle may be sent from the oversight system to the autonomous vehicle or may be generated by systems on the autonomous vehicle. The reaction of the autonomous vehicle may be accomplished based on determining second trajectory related information (the original or current trajectory related information prior to and during the detection of the non-compliant vehicle being the "first" trajectory related information) and operating in accordance with the second trajectory related information, which may include a set of points and one or more speeds, accelerations, and/or decelerations.

IV.(a) Non-Compliant Vehicle—General Behavior

An autonomous vehicle may minimize the amount of expected time spent driving parallel to a non-compliant swerving vehicle.

IV.(b) Non-Compliant Vehicle Definitions

An autonomous vehicle may detect and classify various vehicle scenarios as swerving and/or non-compliant. These scenarios include and are described herein as lane crossing vehicles, too close for comfort vehicles, and oscillating vehicles. A vehicle classified as swerving non-compliant may be one or more of lane crossing, too close for comfort, or oscillating.

IV.(c) Non-Compliant Vehicle—Lane Crossing Vehicle

An autonomous vehicle may detect and classify a vehicle that is within a threshold distance and up to two lanes away as a non-compliant and lane crossing vehicle when the vehicle crosses a lane boundary without fully changing lanes. In various embodiments, the autonomous vehicle classifies the vehicle as non-compliant and lane crossing when the vehicle crosses a lane boundary in the lane adjacent to the current lane, or the lane in which the autonomous vehicle is operating, or when the vehicle is two lanes away and crosses into the lane adjacent to the current lane.

IV.(d) Non-Compliant Vehicle—Too Close for Comfort

When an autonomous vehicle is within the lesser of a threshold distance or a threshold time (based on the velocities of the autonomous vehicle and other vehicle) of being parallel to another vehicle in an adjacent lane with respect to a standard lane width (e.g., 3.66 meters), the autonomous vehicle may detect when the other vehicle's widest point comes within a threshold proximity distance of the lane boundary intersecting or between the autonomous vehicle and the other vehicle.

IV.(e) Non-Compliant Vehicle—Oscillating Vehicle

When driving on lanes of standard width, an autonomous vehicle may detect and classify a vehicle that is within a threshold distance and up to two lanes away as non-compliant and oscillating when the vehicle comes within a second threshold distance laterally of a lane boundary more than a threshold number of times in a set time period without fully changing lanes. For example, if another vehicle comes within the second threshold distance of the autonomous vehicle three times within five seconds, three times within seven seconds, four times within six seconds, or the like, without fully changing lanes, the autonomous vehicle may classify the vehicle as non-compliant and oscillating.

IV.(f) Non-Compliant Vehicle—Memory

Once a vehicle has been identified and classified as swerving non-compliant, an autonomous vehicle may retain in memory that the vehicle is non-compliant until a threshold amount of time has elapsed since the last non-compliant defining event or until the autonomous vehicle is no longer parallel with the swerving non-compliant vehicle, whichever time is greater.

IV.(g) Non-Compliant Vehicle—Already Parallel

If an autonomous vehicle is parallel to an NPC at the moment that it becomes lane crossing non-compliant, the autonomous vehicle may take action to get out of the parallel driving zone with critical safety priority. The autonomous vehicle may prefer to lane bias and change lanes if possible. Otherwise, the autonomous vehicle may lane bias and decelerate/accelerate to minimize the time spent parallel with the lane crossing non-compliant.

If an autonomous vehicle is parallel to a vehicle at the moment that it becomes classified as "too close for comfort" non-compliant, the autonomous vehicle may take action to get out of the parallel driving zone with non-critical safety priority. The autonomous vehicle may prefer to bias and decelerate/accelerate to minimize the time spent parallel.

XI. Detection of Over-Sized Vehicles

An autonomous vehicle may utilize sensor and computing systems onboard the autonomous vehicle to identify an over-sized vehicle surrounding the autonomous vehicle and interact, or react, appropriately. Proper interaction or reaction to an oversized vehicle may include: passing the oversized vehicle, following the oversized vehicle, biasing in lane, and the like. Additionally, an autonomous vehicle may be able to identify a convoy surrounding or including an oversized vehicle and react to maintain safety. The reaction of the autonomous vehicle may be realized via second trajectory related information that is determined in accordance with various factors, criteria, scenarios, and the like described in this section, and the second trajectory related information may include a set of points and one or more speeds, accelerations, and/or decelerations according to which the autonomous vehicle may be caused to operate.

XI.(a) Definition of Over-Sized Vehicle

The system may recognize over-sized vehicles and odd vehicles with protrusions whether the vehicles are marked oversized or not. In various embodiments, an NPC may be defined as an over-sized vehicle if any of its dimensions exceed pre-determined values. For example, if a vehicle has a length of more than 22.86 meters (75 ft), a width of more than 2.59 meters (8 ft 6 in), or a height of more than 4.27 meters (14 ft), then the vehicle may be classified as over-sized.

XI.(b) Lane Change Priority

The autonomous vehicle may prioritize a lane change maneuver to pass an over-sized vehicle or an over-sized vehicle convoy if the oversize vehicle or the over-sized vehicle convoy is more than a threshold number of miles per hour slower than the autonomous vehicle as per efficiency lane change.

XI.(c) Lane Change Preference

The autonomous vehicle may prefer to pass the over-sized vehicles with at least one empty lane between the autonomous vehicle and the over-sized vehicle to minimize the interaction with driving parallel to over-sized vehicles.

XI.(d) Following an Over-Sized Vehicle

If unable to change lanes to pass, an autonomous vehicle may follow behind the last vehicle of the oversize vehicle convoy while maintaining an appropriate following distance with the last vehicle of the oversize vehicle convoy.

XI.(e) No Cut-In with Over-Sized Vehicle Convoy

An autonomous vehicle may avoid cutting in between any vehicles within an over-sized vehicle convoy so that the escort vehicles of the convoy could show the right warning indication to other road users and over-sized vehicles.

XI.(f) Lane Change and Biasing

If unable to keep an empty lane between the autonomous vehicle and an over-sized vehicle when passing, the autonomous vehicle may change lane to the over-sized vehicles' adjacent lane and engage non-critical safety bias to pass if the adjacent lane is not penetrated by over-sized vehicle.

XI.(g) Over-Sized Vehicle Detection

The autonomous vehicle may be able to detect the over-sized vehicle no later than a threshold distance (e.g., a number of meters or feet) before reaching the over-sized vehicle.

XI.(h) Escort Recognition

The autonomous vehicle may be able to recognize over-sized vehicle's escort vehicles in the convoy.

XI.(i) Convoy Definition

A convoy may be defined as vehicles travelling in a group that is within a constant distance and speed of each other indicated by appropriate signs or markers to reflect the bounds of the group. Example convoys may include over-sized vehicles and escorts, military vehicles, VIP motorcades, funeral motorcades, and/or the like.

In various embodiments, vehicles in a convoy with an over-sized vehicle may be detected based on having speeds within a range of speeds based on the speed of the over-sized vehicle and within a range of distances from the over-sized vehicle that may be based on a predetermined value. For example, ranges of speeds for convoy vehicle detection may be a predetermined percentage margin of the speed of the over-sized vehicle or may range by a predetermined value greater and lower than the speed of the over-sized vehicle.

XI.(j) Passing Over-Sized Vehicle Convoy

If conditions allow, an autonomous vehicle may aim to change lanes as soon as it detects the over-sized vehicle or its convoy and start to react no later than a threshold distance before reaching the over-sized vehicle or its convoy.

XI.(k) Over-Sized Vehicle Memory

An autonomous vehicle may retain in memory, for a minimum of a threshold number of seconds, the presence of an over-sized vehicle that is later fully or partially occluded from view.

XI.(l) Following Condition—Efficiency

An autonomous vehicle may follow the over-sized vehicle or its convoy if the over-sized vehicle or its convoy is not a slow moving.

XI.(m) Following Condition—Lane Penetration

An autonomous vehicle may follow the over-sized vehicle or its convoy if the autonomous vehicle is unable to pass due to the over-sized vehicle penetrating the passing lane.

XI.(n) Over-Sized Vehicle Convoy

An autonomous vehicle may treat an over-sized vehicle and one or more escorts for the over-sized vehicle as a convoy.

Figure 8:
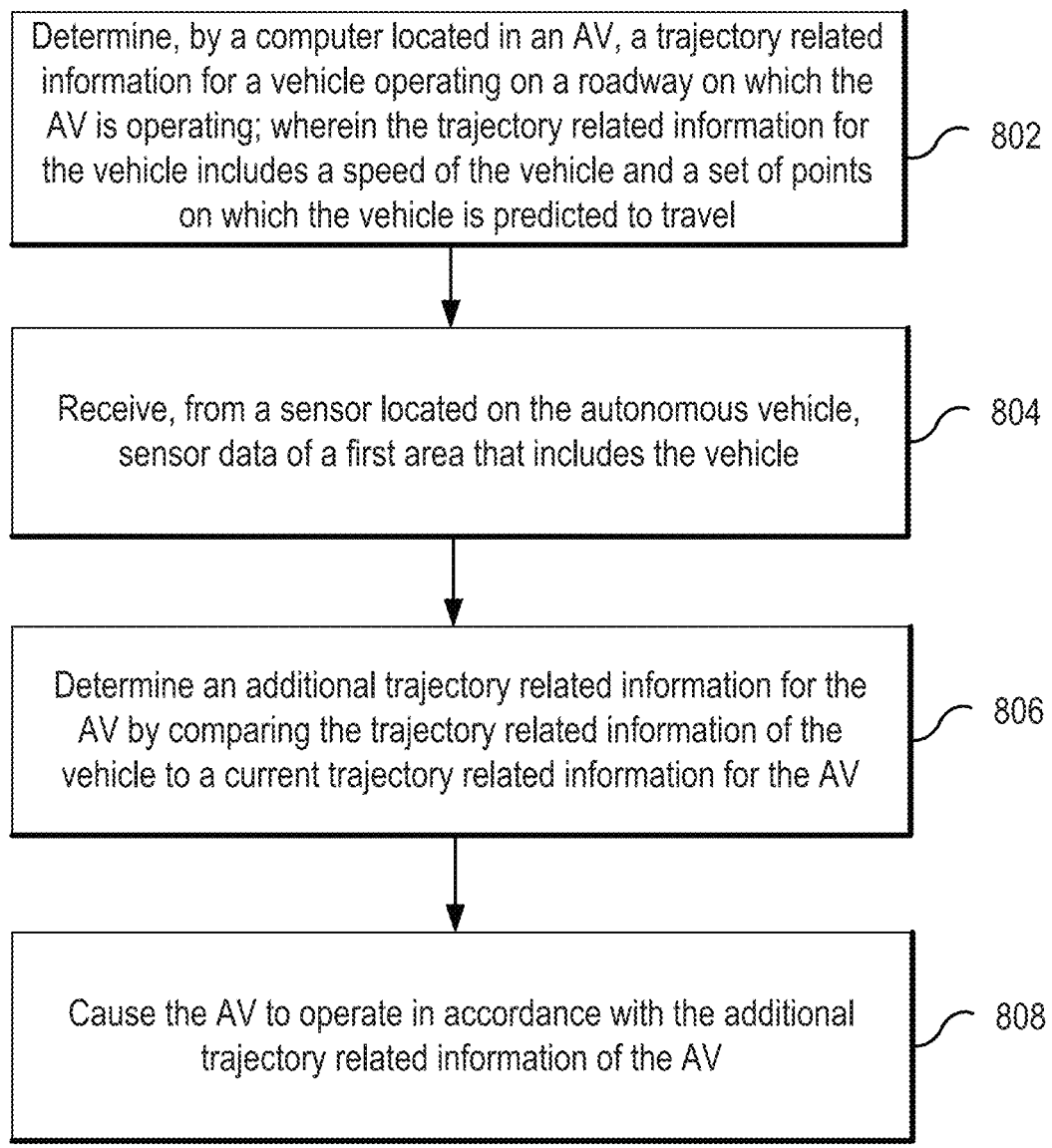
FIG. 8 shows an example flowchart of operations for operating an autonomous vehicle in response to other vehicles, objects, environmental constructs, and the like located near the autonomous vehicle.

Turning to FIG. 8, a flowchart illustrating operations of an example method for operating an autonomous vehicle is provided. Generally, the method may be performed to operate the autonomous vehicle at least in response to other vehicles (e.g., flashing EVs, merging vehicles, cutting vehicles, non-compliant vehicles, over-sized vehicles, a leading vehicle, or the like) in accordance with various embodiments described herein.

At an operation 802, a trajectory related information for a vehicle operating on a roadway on which an AV is operating is determined by a computer located in the AV. The trajectory related information for the vehicle includes a speed of the vehicle and a set of points on which the vehicle is predicted to travel. Accordingly, the trajectory related information may indicate whether or not the vehicle is in the same lane as the AV, whether or not the vehicle is biasing in any lane, whether or not the vehicle is exhibiting any non-compliant behavior, whether or not the vehicle is decelerating, or the like.

At an operation 804, sensor data of a first area that includes the vehicle is received from a sensor located on the autonomous vehicle. The sensor data may include sensor data indicating characteristics, features, and/or behavior of the vehicle. For example, the sensor data may indicate a presence of flashing lights on the vehicle, indicate dimensions of the vehicle, or the like.

At an operation 806, an additional trajectory related information for the AV is determined by comparing the trajectory related information of the vehicle to a current trajectory related information for the AV. The additional trajectory related information may be based on a category on which the vehicle belongs that is determined using the sensor data. The additional trajectory related information may allow the autonomous vehicle to maintain at least a distance between the autonomous vehicle and the vehicle.

At an operation 808, the AV is caused to operate in accordance with the additional trajectory related information of the AV.

In some embodiments, the example method may further include determining that the sensor data indicates a presence of flashing lights on the vehicle and determining, based on the presence of the flashing lights on the vehicle, that the category to which the vehicle belongs is a flashing emergency vehicle. The additional trajectory related information of the autonomous vehicle may then be determined based on the category being the flashing emergency vehicle. In some embodiments, the trajectory related information of the vehicle indicates that the vehicle (e.g., categorized as a flashing emergency vehicle) is operating within a same lane as a lane on the roadway on which the autonomous vehicle is operating, and the additional trajectory related information for the autonomous vehicle may indicate a change of lane for the autonomous vehicle from the lane on which the autonomous vehicle is operating to another lane on the roadway. In some embodiments, the additional trajectory related information for the autonomous vehicle indicates a deceleration for the autonomous vehicle and a steering for the autonomous vehicle to a second area off of the roadway.

In some embodiments, the example method may further include determining that the sensor data indicates one or more dimensions of the vehicle and determining, based on the one or more dimensions being greater than a predetermined value for the one or more dimensions, that the category to which the vehicle belongs is an over-sized vehicle. The additional trajectory related information of the autonomous vehicle may then be determined based on the category being the over-sized vehicle. In some embodiments, the example method further includes, in accordance with the category to which the vehicle belongs being the over-sized vehicle, identifying one or more additional vehicles that are each operating within a range of speeds that is determined based on the speed of the vehicle and within a range of distances from the vehicle based on a predetermined distance, and determining the additional trajectory related information for the autonomous vehicle based on the trajectory related information for the vehicle and trajectory related information for the one or more additional vehicles.

In some embodiments, in accordance with determining that the trajectory related information for the vehicle indicates that a number of lane crossings over a lane boundary of the roadway that is greater than a predetermined number within a predetermined amount of time, the additional trajectory related information for the autonomous vehicle is configured to increase the distance between the autonomous vehicle and the vehicle.

In some embodiments, in accordance with a determination that the trajectory for the vehicle partially crosses a lane boundary of the roadway, the additional trajectory related information for the autonomous vehicle is configured to increase the distance between the autonomous vehicle and the vehicle.

In some embodiments, in accordance with a determination that the trajectory related information for the vehicle indicates that the vehicle is entering a lane in which the autonomous vehicle is operating on the roadway within a predetermined range of distance in front of the autonomous vehicle, the additional trajectory related information for the autonomous vehicle indicates a deceleration for the autonomous vehicle within the lane in which the autonomous vehicle is operating. The deceleration for the autonomous vehicle may be determined based on a speed of the autonomous vehicle. The deceleration for the autonomous vehicle may be determined based on a speed of the autonomous vehicle and a predetermined maximum acceleration allowed for the vehicle that is based on the category of the vehicle. The additional trajectory related information may include an acceleration or a deceleration that is not greater than a predetermined value, which may be based on a steady-state cruising speed of the autonomous vehicle.

In some embodiments, the additional trajectory related information includes an acceleration or a deceleration that does not exceed a value such that the speed of the autonomous vehicle is maintained within a predetermined range of speeds.

In some embodiments, the first area that includes the vehicle includes an intersection, and the autonomous vehicle is caused to operate in accordance with the additional trajectory related information based on determining a length in time at which the vehicle is located at the intersection. In some embodiments, the autonomous vehicle is caused to operate in accordance with the additional trajectory after a predetermined amount of time after determining that the vehicle is in motion in the intersection In some embodiments, the first area is an on-ramp to the roadway on which the autonomous vehicle is operating, and wherein the trajectory related information for the vehicle is identified based on map data that includes predefined locations at which the vehicle is expected to merge into a lane in which the autonomous vehicle is operating on the roadway.

In some embodiments, the set of points of the trajectory related information for the vehicle is predicted based on a presence of one or more other vehicles operating on the roadway.

XII. Pedestrian and/or Cyclist Interaction

An autonomous truck may identify, classify, and properly interact with pedestrians and cyclists. Each jurisdiction (e.g., state, country) may have its own regulations to be followed with any vehicle is operating around pedestrians and/or cyclists. Some of the regulations are high-level, such as avoidance of encroaching on cross-walks or bicycle lanes. Other regulations are more granular and depend on the relative position of the trajectories of the pedestrian or cyclist as well as the vehicle. For example, when a vehicle is turning from one road to another, and there is a dedicated lane for such a turn, the regulations may dictate how to interact with a cyclist in a bicycle lane or path that is adjacent to the turning lane. In order for an autonomous truck to operate properly, in accordance with applicable regulations, the compliance module (shown as 166 in FIG. 1) of the autonomous truck can determine which regulation(s) to apply based upon location and the type of interaction. In some embodiments, the compliance module can not only determine where the autonomous vehicle is located (e.g., based on location provided by a GPS device on the autonomous vehicle), but it can also identify a pedestrian and/or cyclist and can track the motions of the pedestrian/cyclist in relation to the roadway and lanes or specialized surrounding areas (e.g., cross-walk, sidewalk, bike lane).

XIII. Oversight System

As described above, an autonomous vehicle may be in communication with an oversight system which may serve various purposes related to the operation of the autonomous vehicle, such as but not limited to monitoring and/or trigger MRC fault conditions.

Figure 7:
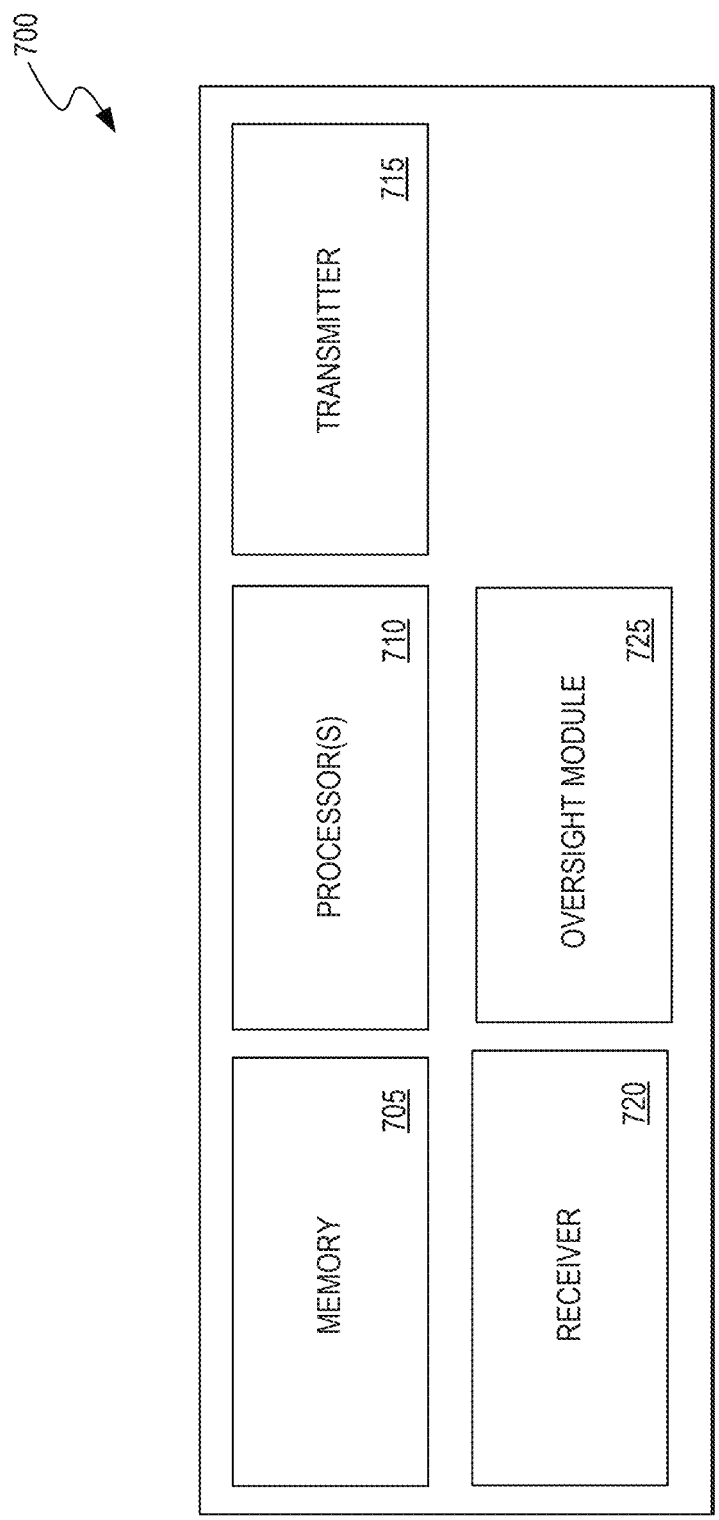
FIG. 7 shows an exemplary block diagram of a remote computer associated with an oversight system.

FIG. 7 shows an exemplary block diagram of a remote computer 700 associated with an oversight system. The oversight system (shown as 350 in FIG. 3) may include the remote computer 700 which can be located at a fixed location outside of an autonomous vehicle. In this patent document, the descriptions related to operations performed by the oversight system can be performed by the oversight module (shown as 725 in FIG. 7) in the remote computer 700. The remote computer 700 includes at least one processor 710 and a memory 705 having instructions stored thereupon. The instructions, upon execution by the processor 710, configure the remote computer 700 to perform the operations related to the oversight module 725, where the oversight module 725 can perform operations related to the oversight system as described at least in FIGS. 1 to 3 and in the various embodiments described in this patent document. A remote computer 700 may include one or more servers. The transmitter 715 transmits or sends information or data to one or more autonomous vehicles, and the receiver 720 receives information or data from one or more autonomous vehicles.

In order to perform the above features, an autonomous vehicle may utilize any of the sensors, particularly the data obtained from the sensors, in conjunction with the computing facilities on-board the autonomous vehicle, such as those associated with or in communication with the VCU. Alternatively, or additionally, the above features may be executed by an autonomous vehicle with aid from an oversight system, or control center, and optionally with aid from a human remote control operator. The oversight system, and in some cases the remote control operator, may communicate environmental data, map updates, instructions, or other information to an autonomous vehicle. An on-board map, such as a high-definition map, may be used by an autonomous vehicle to accomplish some of the features described herein, particularly when knowledge of location and local regulations (e.g., speed limits, obligations under the law, traffic conventions, intersection types) is needed to complete a task described in the feature.

While this document refers to an autonomous truck, it should be understood that any autonomous ground vehicle may have such features. Autonomous vehicles which traverse over the ground may include: semis, tractor-trailers, 18 wheelers, lorries, class 8 vehicles, passenger vehicles, transport vans, cargo vans, recreational vehicles, golf carts, transport carts, and the like.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of characteristics that may be specific to particular embodiments or sections of particular inventions. Certain characteristics that are described in this patent document in the context of separate embodiments or sections can also be implemented in combination in a single embodiment or a single section. Conversely, various characteristics that are described in the context of a single embodiment or single section can also be implemented in multiple embodiments or multiple sections separately or in any suitable sub combination. A feature or operation described in one embodiment or one section can be combined with another feature or another operation from another embodiment or another section in any reasonable manner. Moreover, although characteristics may be described above as acting in certain combinations and even initially claimed as such, one or more characteristics from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of operating an autonomous vehicle, comprising:
   determining, by a computer located in the autonomous vehicle, a trajectory related information of a vehicle operating on a roadway on which the autonomous vehicle is operating, wherein the trajectory related information for the vehicle includes a speed of the vehicle and a set of points on which the vehicle is predicted to travel;
   receiving, from a sensor located on the autonomous vehicle, sensor data of a first area that includes the vehicle;
   determining an additional trajectory related information for the autonomous vehicle by comparing the trajectory related information of the vehicle to a current trajectory related information of the autonomous vehicle,
      wherein the additional trajectory related information is based on a category to which the vehicle belongs that is determined using the sensor data, and
      wherein the additional trajectory related information allows the autonomous vehicle to maintain at least a distance between the autonomous vehicle and the vehicle; and
   causing the autonomous vehicle to operate in accordance with the additional trajectory related information of the autonomous vehicle,
   wherein, in accordance with determining that the trajectory related information for the vehicle indicates that a number of lane crossings performed by the vehicle over a lane boundary of the roadway is greater than a number within a predetermined amount of time, the additional trajectory related information for the autonomous vehicle is configured to increase the distance between the autonomous vehicle and the vehicle.

2. The method of claim 1, wherein the current trajectory related information of the autonomous vehicle includes a set of points on which the autonomous vehicle is predicted to travel, and an expected speed for the autonomous vehicle at each of the set of points,
   wherein, in accordance with a determination that the trajectory related information for the vehicle indicates that the vehicle is entering a lane in which the autonomous vehicle is operating on the roadway within a predetermined range of distance in front of the autonomous vehicle, the additional trajectory related information for the autonomous vehicle indicates a deceleration for the autonomous vehicle within the lane in which the autonomous vehicle is operating.

3. The method of claim 2, wherein the deceleration for the autonomous vehicle is determined based on a speed of the autonomous vehicle.

4. The method of claim 2,
   wherein the deceleration for the autonomous vehicle is determined based on a speed of the autonomous vehicle and a predetermined maximum deceleration allowed for the vehicle, and
   wherein the predetermined maximum deceleration allowed for the vehicle is based on the category of the vehicle.

5. The method of claim 2, wherein the additional trajectory related information includes an acceleration or a deceleration that is not greater than a predetermined value.

6. The method of claim 5, wherein the predetermined value is based on a steady-state cruising speed of the autonomous vehicle.

7. A system for operating an autonomous vehicle, comprising a computer that includes a processor and a memory storing instructions that, when executed by the processor, cause the system to:
   determine a trajectory related information of a vehicle operating on a roadway on which the autonomous vehicle is operating, wherein the trajectory related information for the vehicle includes a speed of the vehicle and a set of points on which the vehicle is predicted to travel;
   receive, from a sensor located on the autonomous vehicle, sensor data of a first area that includes the vehicle;
   determine an additional trajectory related information for the autonomous vehicle by comparing the trajectory related information of the vehicle to a current trajectory related information of the autonomous vehicle,
      wherein the additional trajectory related information is based on a category to which the vehicle belongs that is determined using the sensor data, and
      wherein the additional trajectory related information allows the autonomous vehicle to maintain at least a distance between the autonomous vehicle and the vehicle; and
   cause the autonomous vehicle to operate in accordance with the additional trajectory related information of the autonomous vehicle,
   wherein, in accordance with determining that the trajectory related information for the vehicle indicates that a number of lane crossings performed by the vehicle over a lane boundary of the roadway is greater than a number within a predetermined amount of time, the additional trajectory related information for the autonomous vehicle is configured to increase the distance between the autonomous vehicle and the vehicle.

8. The system of claim 7, wherein, the current trajectory related information of the autonomous vehicle includes a set of points on which the autonomous vehicle is predicted to travel, and an expected speed for the autonomous vehicle at each of the set of points,
- wherein, in accordance with a determination that the trajectory related information for the vehicle indicates that the vehicle is entering a lane in which the autonomous vehicle is operating on the roadway within a predetermined range of distance in front of the autonomous vehicle, the additional trajectory related information for the autonomous vehicle indicates a deceleration for the autonomous vehicle within the lane in which the autonomous vehicle is operating.

9. The system of claim 8, wherein the deceleration for the autonomous vehicle is determined based on a speed of the autonomous vehicle.

10. The system of claim 8, wherein the deceleration for the autonomous vehicle is determined based on a speed of the autonomous vehicle and a predetermined maximum deceleration allowed for the vehicle, and
- wherein the predetermined maximum deceleration allowed for the vehicle is based on the category of the vehicle.

11. The system of claim 8, wherein the additional trajectory related information includes an acceleration or a deceleration that is not greater than a predetermined value.

12. The system of claim 11, wherein the predetermined value is based on a steady-state cruising speed of the autonomous vehicle.

13. The system of claim 7, wherein the additional trajectory related information includes an acceleration or a deceleration that does not exceed a value such that the speed of the autonomous vehicle is maintained within a predetermined range of speeds.

14. A non-transitory computer readable program storage medium having code stored thereon, the code, when executed by a processor, causing the processor to:
- determine a trajectory related information of a vehicle operating on a roadway on which an autonomous vehicle is operating, wherein the trajectory related information for the vehicle includes a speed of the vehicle and a set of points on which the vehicle is predicted to travel;
- receive, from a sensor located on the autonomous vehicle, sensor data of a first area that includes the vehicle;
- determine an additional trajectory related information for the autonomous vehicle by comparing the trajectory related information of the vehicle to a current trajectory related information of the autonomous vehicle,
  - wherein the additional trajectory related information is based on a category to which the vehicle belongs that is determined using the sensor data, and
  - wherein the additional trajectory related information allows the autonomous vehicle to maintain at least a distance between the autonomous vehicle and the vehicle; and
- cause the autonomous vehicle to operate in accordance with the additional trajectory related information of the autonomous vehicle,
- wherein, in accordance with determining that the trajectory related information for the vehicle indicates that a number of lane crossings performed by the vehicle over a lane boundary of the roadway is greater than a number within a predetermined amount of time, the additional trajectory related information for the autonomous vehicle is configured to increase the distance between the autonomous vehicle and the vehicle.

15. The non-transitory computer readable program storage medium of claim 14, wherein the additional trajectory related information includes an acceleration or a deceleration that does not exceed a value such that the speed of the autonomous vehicle is maintained within a predetermined range of speeds.

16. The non-transitory computer readable program storage medium of claim 14, wherein, the current trajectory related information of the autonomous vehicle includes a set of points on which the autonomous vehicle is predicted to travel, and an expected speed for the autonomous vehicle at each of the set of points,
- wherein, in accordance with a determination that the trajectory related information for the vehicle indicates that the vehicle is entering a lane in which the autonomous vehicle is operating on the roadway within a predetermined range of distance in front of the autonomous vehicle, the additional trajectory related information for the autonomous vehicle indicates a deceleration for the autonomous vehicle within the lane in which the autonomous vehicle is operating.

17. The non-transitory computer readable program storage medium of claim 16, wherein the deceleration for the autonomous vehicle is determined based on a speed of the autonomous vehicle.

* * * * *